US011413903B2

(12) United States Patent
Hecht Olsen

(10) Patent No.: US 11,413,903 B2
(45) Date of Patent: Aug. 16, 2022

(54) CASTOR WHEEL

(71) Applicant: NGI A/S, Norresundby (DK)

(72) Inventor: Tomas Hecht Olsen, Klarup (DK)

(73) Assignee: NGI A/S

( * ) Notice: Subject to any disclaimer, the term of this patent is extended or adjusted under 35 U.S.C. 154(b) by 0 days.

(21) Appl. No.: 16/966,602

(22) PCT Filed: Mar. 1, 2019

(86) PCT No.: PCT/DK2019/050077
§ 371 (c)(1),
(2) Date: Jul. 31, 2020

(87) PCT Pub. No.: WO2019/166070
PCT Pub. Date: Sep. 6, 2019

(65) Prior Publication Data
US 2021/0394557 A1     Dec. 23, 2021

(30) Foreign Application Priority Data

Mar. 2, 2018  (DK) .............................. PA201870140

(51) Int. Cl.
*B60B 33/00*          (2006.01)

(52) U.S. Cl.
CPC ...... *B60B 33/0028* (2013.01); *B60B 33/0002* (2013.01); *B60B 33/0078* (2013.01); *B60B 2360/102* (2013.01); *B60B 2900/511* (2013.01)

(58) Field of Classification Search
CPC ............ B60B 33/0028; B60B 33/0002; B60B 33/0039; B60B 2900/511
See application file for complete search history.

(56) References Cited

U.S. PATENT DOCUMENTS

| | | | | |
|---|---|---|---|---|
| 2,617,698 A | * | 11/1952 | Gaines | B60B 27/02 301/124.1 |
| 3,177,516 A | * | 4/1965 | Price | F16C 13/006 16/18 A |
| 3,928,888 A | * | 12/1975 | Lapham | B60B 33/0052 16/35 R |
| 4,113,328 A | * | 9/1978 | Vander Meulen | F16C 33/78 384/492 |

(Continued)

FOREIGN PATENT DOCUMENTS

FR    2 637 039 A1   3/1990
GB    1 403 190 A    8/1975

OTHER PUBLICATIONS

Bibliographic data including English Abstract for Document FR 2 637 039, published Mar. 30, 1990, 1 page.

(Continued)

*Primary Examiner* — Jeffrey O'Brien
(74) *Attorney, Agent, or Firm* — Ware, Fressola, Maguire & Barber LLP

(57) ABSTRACT

The present invention relates to a castor wheel structure, comprising a wheel part (18) and a castor wheel house (28), on which a transition element can be mounted, such as a spindle structure (1) or a flange structure (2), which again can be mounted on equipment that is to be made mobile, which wheel part (18) is unilaterally suspended and arranged about a substantially horizontal shaft on the castor wheel house (28).

16 Claims, 27 Drawing Sheets

(56) References Cited

U.S. PATENT DOCUMENTS

| | | | | |
|---|---|---|---|---|
| 4,184,227 | A * | 1/1980 | Propst | B60B 33/0052 |
| | | | | 16/35 R |
| 5,002,163 | A * | 3/1991 | Kidd | B60B 33/021 |
| | | | | 280/33.994 |
| 5,461,753 | A * | 10/1995 | Rounds | B60B 33/025 |
| | | | | 16/21 |
| 5,479,677 | A * | 1/1996 | Chong | B60B 33/0002 |
| | | | | 16/21 |
| 5,518,322 | A * | 5/1996 | Hicks | B60B 33/0068 |
| | | | | 384/492 |
| 5,634,240 | A * | 6/1997 | Brokaw | A45C 5/14 |
| | | | | 248/205.2 |
| 7,143,472 | B2 * | 12/2006 | Hicks | B60B 33/0073 |
| | | | | 16/18 CG |
| 9,168,689 | B2 * | 10/2015 | Stoehr | B60B 33/0042 |
| 9,308,775 | B2 * | 4/2016 | Matsunaga | B60B 33/0063 |
| 2015/0258850 | A1 * | 9/2015 | Schioppa | B60B 33/025 |
| | | | | 16/37 |
| 2015/0375565 | A1 | 12/2015 | Beatty | |
| 2017/0072742 | A1 * | 3/2017 | Groppe | B60B 33/006 |

OTHER PUBLICATIONS

English machine translation of Document FR 2 637 039, 3 pages.
International Search Report and Written Opinion of the International Searching Authority, International Application No. PCT/DK2019/050077, dated May 10, 2019, 10 pages.
Danish Search Report, Application No. PA 2018 70140, dated Jun. 13, 2018, 4 pages.

* cited by examiner

CASTOR WHEEL

BACKGROUND

The present invention relates to a castor wheel structure, comprising a wheel part and a castor wheel house, on which a transition element can be mounted, such as a spindle structure or a flange structure, which again can be mounted on equipment that is to be made mobile, which wheel part is unilaterally suspended and arranged about a substantially horizontal shaft on the castor wheel house, which castor wheel structure also comprises a seal between the transition element and the upper part of the castor wheel house, which seal is configured with contours, which are adapted to the structure and thereby substantially ensure continuous surfaces.

Castor wheels are also known as machine wheels and are wheels that in addition to the wheel part itself comprise a mounting element, which is typically standardized. Thus, the wheel is a building part, which can generally be replaced by other similar wheels. There are basically two types of castor wheels. One has a turntable, so that the wheel is allowed to oscillate freely, and it can be equipped with a brake both on the wheel itself and on the turntable, and as regards the second type, the shaft of the castor wheel is fixably mounted, and it can also be equipped with a brake on the wheel itself.

Generally, castor wheels are used for increasing the mobility of many different forms of objects, such as various forms of machines, for instance mixers, fillers, and machines and apparatuses with functions that are to be used in several locations as well as conveyor belts, racks and work tables. Other fields, in which castor wheels are frequently used are for instance for movable hospital beds, trolleys, vacuum cleaners as well as other mobile apparatuses.

The castor wheel is a rotatable wheel (not a guide wheel), which is typically used for manual movement of equipment by pushing it at a speed that usually does not exceed the walking pace, and the castor wheel is typically not used for equipment in continuous movement.

Common to existing castor wheels is that they are not suitable for use in areas with particular hygiene requirements, as the moving pairs, which they will inevitably contain, are not protected against the ingress of dirt and germ-filled material, which means that existing wheels are very difficult to clean completely and will therefore always constitute a risk of contamination in for instance hospital environments and laboratories or in the food industry, where there is also focus on the pathways and habitats of microorganisms.

In US 2015/0258850 a castor wheel structure is described, comprising a wheel part and a castor wheel house, on which a transition element can be mounted, which again can be mounted on equipment, such as hospital equipment, which is to be made mobile, which wheel part is unilaterally suspended and arranged about a substantially horizontal shaft on the castor wheel house. The castor wheel structure moreover comprises a seal between the transition element and the upper part of the castor wheel house, which seal is configured with contours that are adapted to the structure and thereby substantially ensure continuous surfaces.

SUMMARY

Thus, the object of the present invention is to provide a preferably maintenance-free castor wheel structure, which has a hygienically correct configuration, and which preferably meets the standards that can lead to hygienic approval of the product in accordance with the guidelines of for instance EHEDG. 3-A and USDA.

The objects mentioned above are obtained by means of a castor wheel structure of the kind mentioned initially, comprising a wheel part and a castor wheel house, on which a transition element can be mounted, such as a spindle structure or a flange structure, which again can be mounted on equipment that is to be made mobile, which wheel part is unilaterally suspended and arranged about a substantially horizontal shaft on the castor wheel house, which castor wheel structure also comprises a seal between the transition element and the upper part of the castor wheel house, which seal is configured with contours, which are adapted to the structure and thereby substantially ensure continuous surfaces. The castor wheel structure is characteristic in that it comprises a seal between the wheel part and the castor wheel house, which seal is configured with contours, which are adapted to the structure and thereby substantially ensure continuous surfaces.

Thus sealing of the inner part of the structure is obtained, so that exchange of material between the inside and the outside of the castor wheel structure cannot take place. Thereby a maintenance-free structure is obtained, which does not discharge hygienically problematic substances to the environment. Furthermore, by means of the obtained continuous surfaces, it is ensured that the structure can easily be cleaned with the lowest possible risk of accumulation of dirt and deposits on the structure.

According to the present invention, the seal between the wheel part and the castor wheel house may be fixably mounted on either the wheel part or the castor house and has sliding abutment with the other part. It is thus possible to mount the seal on the wheel part and have sliding abutment with the castor house or mount the seal on the castor house and have sliding abutment with the wheel part.

A preferred embodiment of the invention is characteristic in that the seal between the wheel part and the castor wheel house is formed as a tongue, which is an integral part of the wheel path. Hereby a simple and functional structure is obtained, with which a few individual parts contribute to ensuring that the objects of the invention are met.

When the transition element is a spindle structure, it must according to a preferred embodiment be equipped with a sealing ring, which seals between the spindle and a transition piece, which is also equipped with a seal. Hereby the connection with the equipment that is to be made mobile can also be hygienic. However, as will be obvious to a skilled person, it requires that a hygienic seal is also secured at the upper thread, by means of which the spindle structure is attached to the equipment.

When the transition element is a flange structure, it must according to another preferred embodiment be provided with a seal between the flange itself and the equipment, and under the flange a seal is mounted, which flange is attached by means of nuts with seals placed upon them. In the same manner as above, this ensures that the connection with the equipment that is to be made mobile is hygienic.

It is advantageous that the seals are arranged in the periphery at the transitions and are configured with surfaces, which provide smooth, soft transitions, and most of the seals are activated and kept in place by being retained with pressure in the tracks and cavities, in which they are mounted. Thus, surfaces are obtained, which are easy to clean and inspect.

It is also advantageous that all outer surfaces are smooth (Ra of max. 0.8µ), self-draining and provided with bending radiuses of at least 3.2 mm. This ensures that some of the formal requirements for obtaining hygienic approval are met.

According to the invention, inner braking of the wheel can be obtained. For this object, the castor wheel structure comprises a brake shaft fitted with a crank, which brake shaft is provided with a seal that ensures sealing between the brake shaft and the castor wheel house.

It is advantageous that the brake shaft can function, so that it either activates braking of the wheel movement or of the pivot movement or of both movements.

The braking mentioned above can take place by the brake shaft having connection with a camshaft, which can activate and deactivate a pawl system, which in connection with index plates can lock the wheel movement and/or the pivot movement, respectively.

Thus, very precise and safe braking of the wheel's movements is obtained. At correct dimensioning, the wheel will as a maximum have to turn or roll a very small distance (for instance 2-4 mm) during activation of the brake, for the braking to be executed.

According to the invention, it is advantageous that the camshaft actively secures both activation and deactivation of the brake systems, which comprise a wheel spring arm and a wheel index arm, by means of a slot-like control of the wheel spring arm and the wheel index arm. This ensures that the brakes will not rub.

Advantageously, the wheel spring arm and the wheel index arm are provided with pawls for engagement with the index plates and with preferably encompassing springs, which contribute to correct activation of the brake systems, and which contribute to giving the user a suitably tactile feedback when the brake is activated and deactivated.

In a preferred embodiment, the brake shaft is provided with a mounted solid limit stop, which limits the oscillation both on activation and deactivation of the brake, and which furthermore ensures that the brake shaft cannot be pulled out. This embodiment ensures that the structure is able to accommodate substantial forces, for instance up to 2000 N, and the brake shaft is kept in place inside the structure.

The crank can advantageously be provided with a long and a short arm, wherein the long arm is used for activation of the brake by turning of the shaft in clockwise direction, and the short arm is used for deactivation of the brake by turning of the shaft in anti-clockwise direction. Thereby a natural perception as to how the user will have to activate and deactivate the brake is obtained.

In the preferred embodiments of the invention, the sealing rings are manufactured of NBR or silicone, and the wheel coating, which also functions as seal, is manufactured of a polyurethane material or NBR or thermoplastic rubber.

It is also advantageous that the wheel house, the spindle, the flange and the brake arm with the shaft are manufactured of corrosion-proof steel 304, which is a suitable material for hygienic structures, which are also subjected to strength requirements.

The invention will be explained further in the following with reference to the drawing, in which

BRIEF DESCRIPTION OF THE DRAWINGS

FIGS. 1-6 show various practical configurations of hygienic castor wheel structures according to the present invention, wherein FIGS. 1-3 show embodiments with spindle attachment, and FIGS. 4-6 show embodiments with flange attachment. In particular, FIG. 1 and 4 show castor wheel structures with brake, FIGS. 2 and 5 show structures without brake and with pivotally suspended wheels, and FIGS. 3 and 6 show structures with castor wheels that cannot turn.

Figures 1, 2, 3:
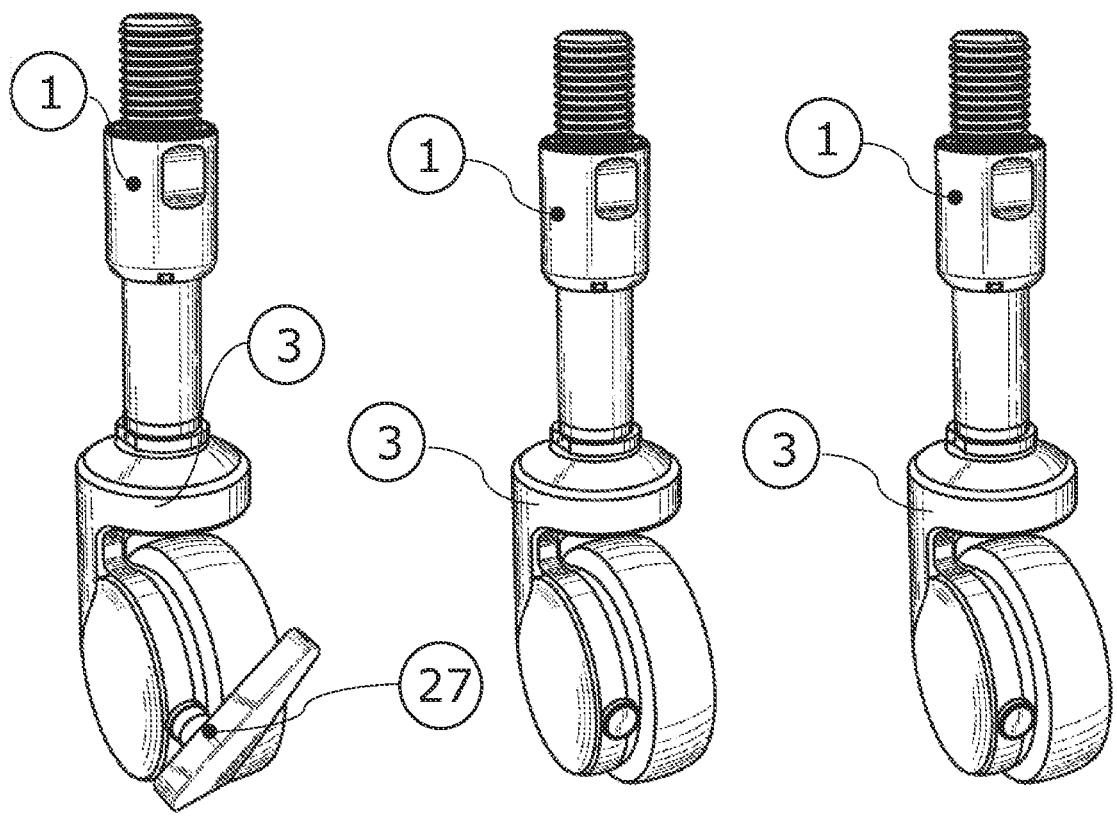
Figures 4, 5:
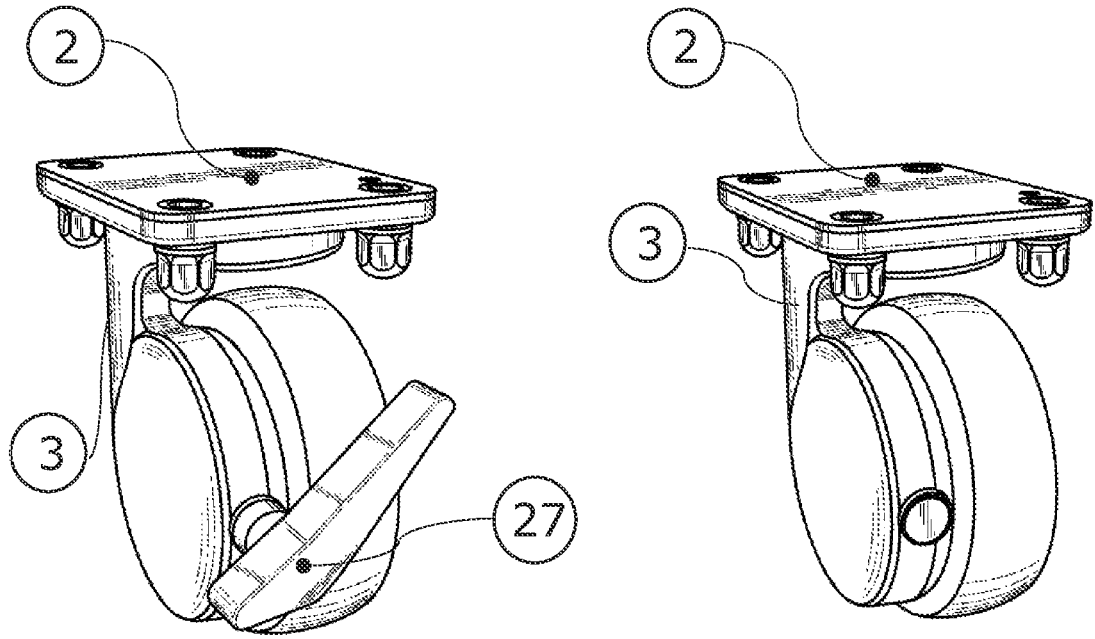
Figure 6:
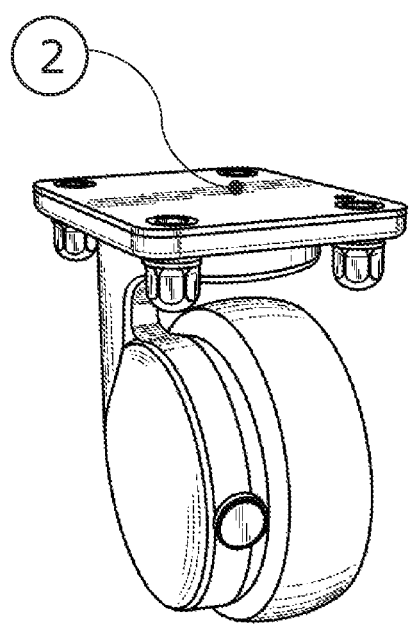

It is not possible to tell the difference from the outside between the two types in FIGS. 2 and 5 and in FIGS. 3 and 6, respectively, but the difference is that the swing or pivot movement is locked in the latter type.

Figure 7:
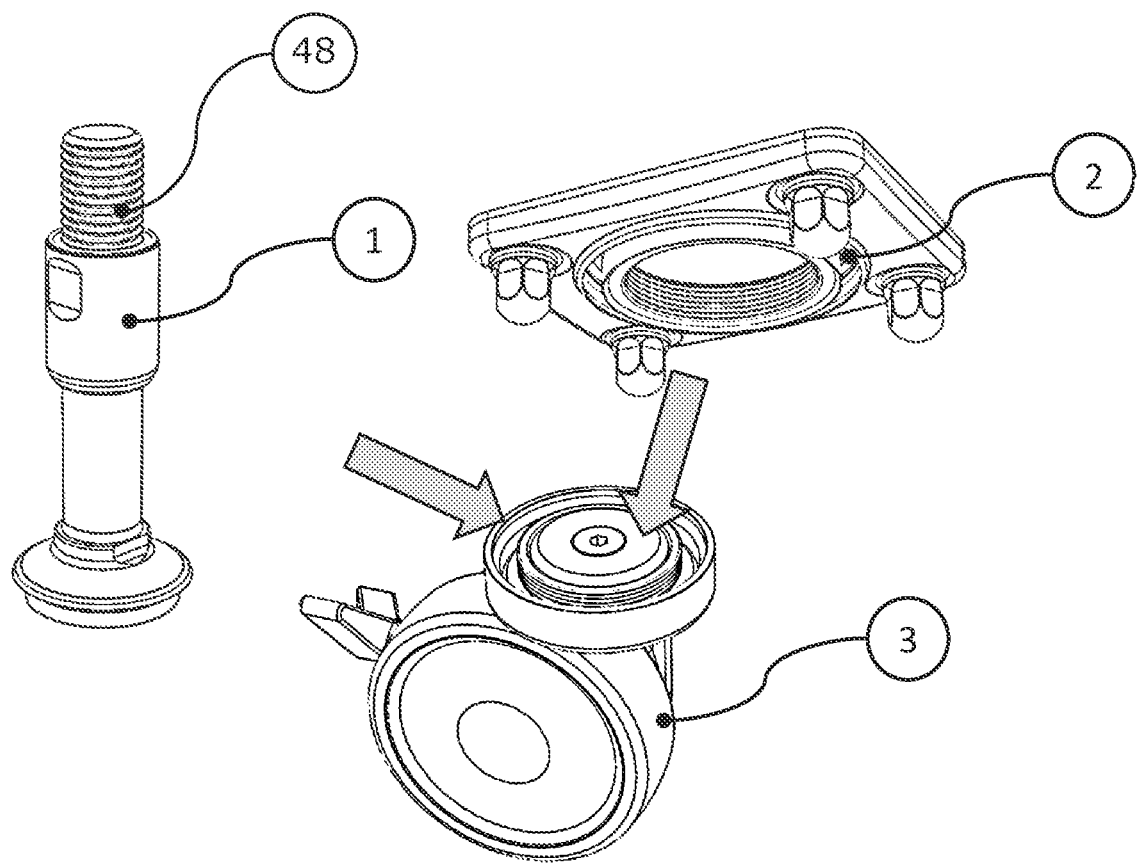
Figure 8:
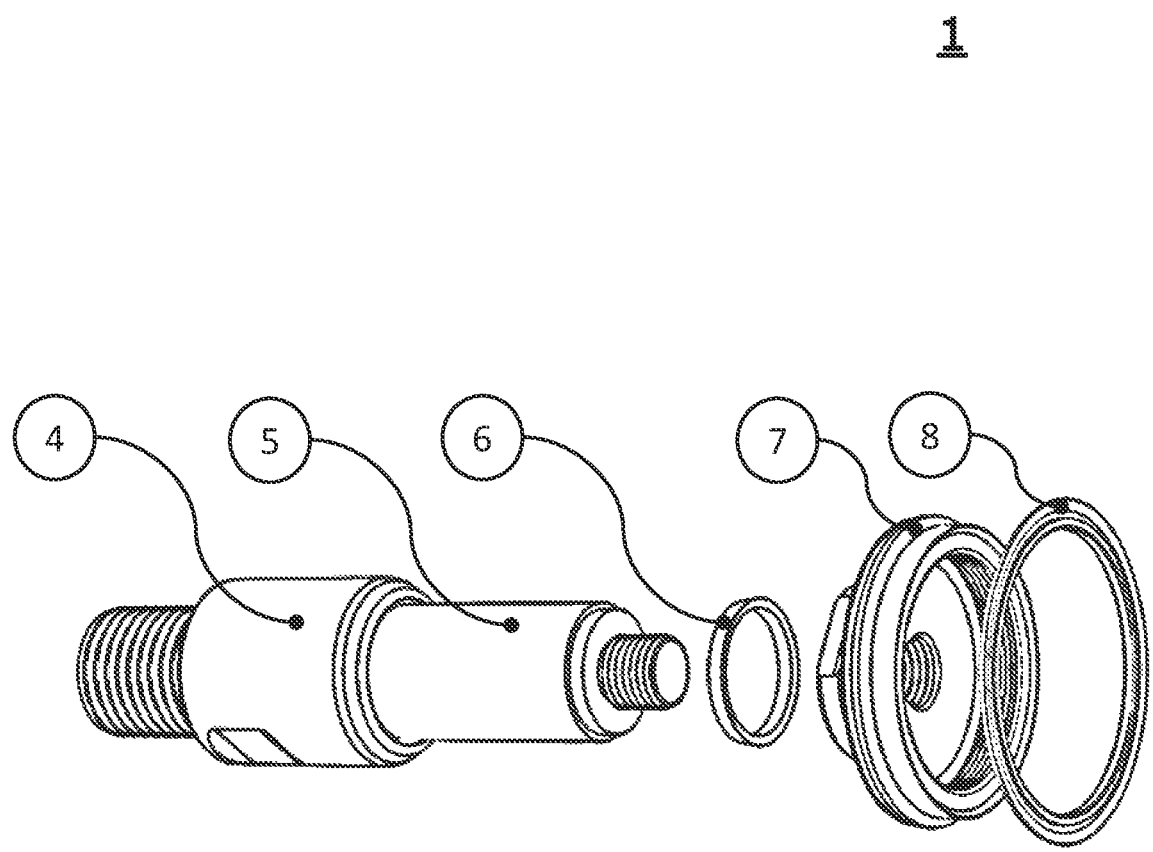
Figure 9:
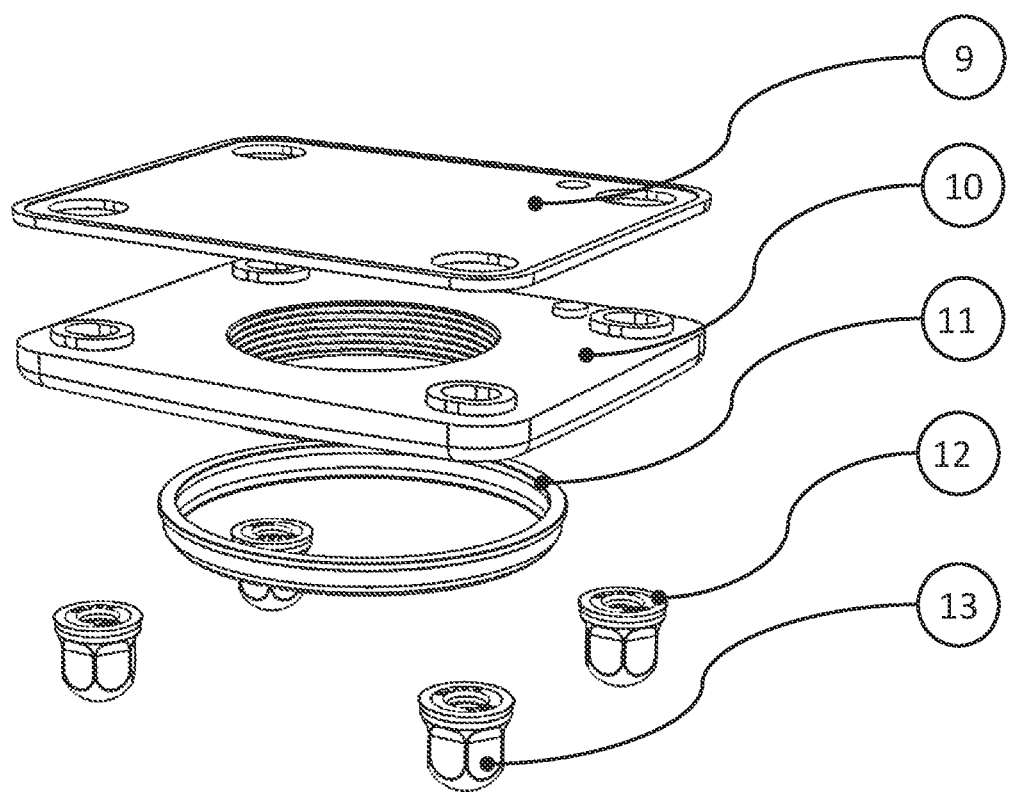
Figure 10:
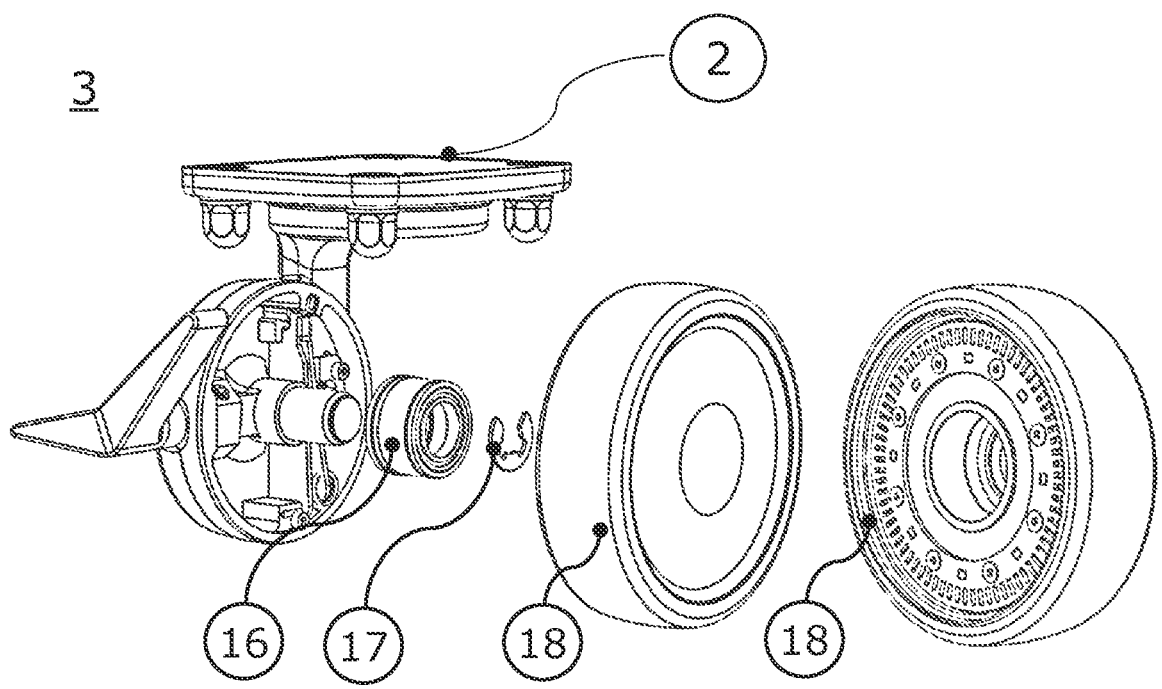
Figure 11A:
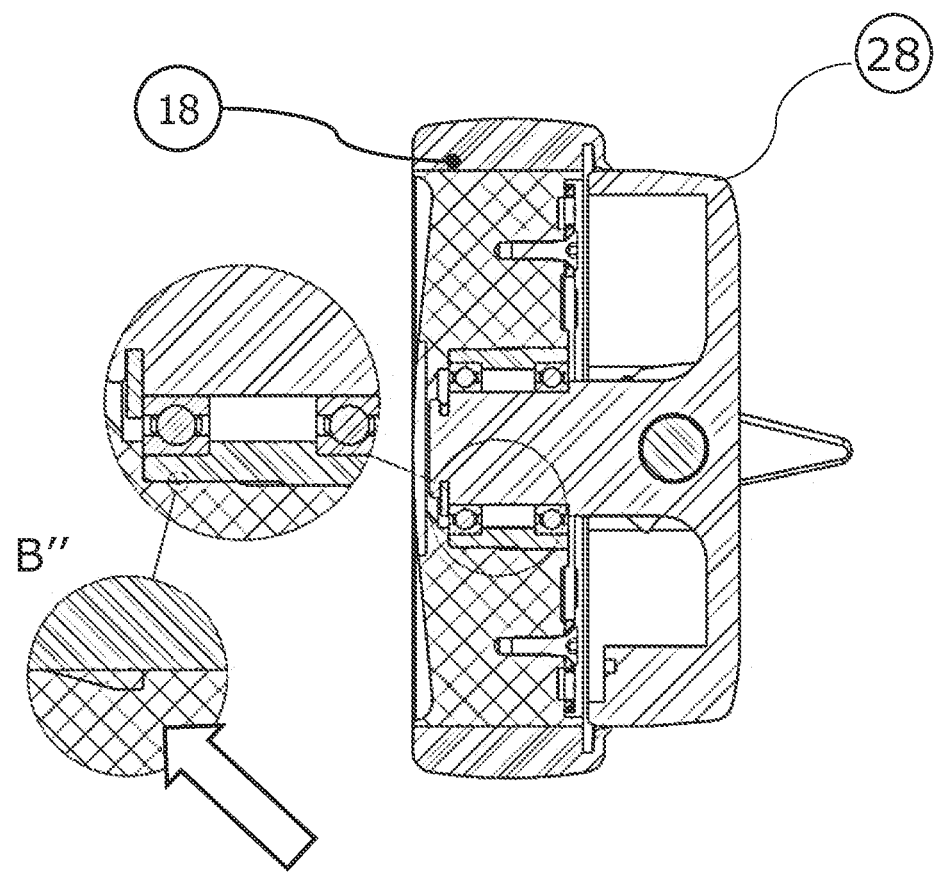
Figure 11B:
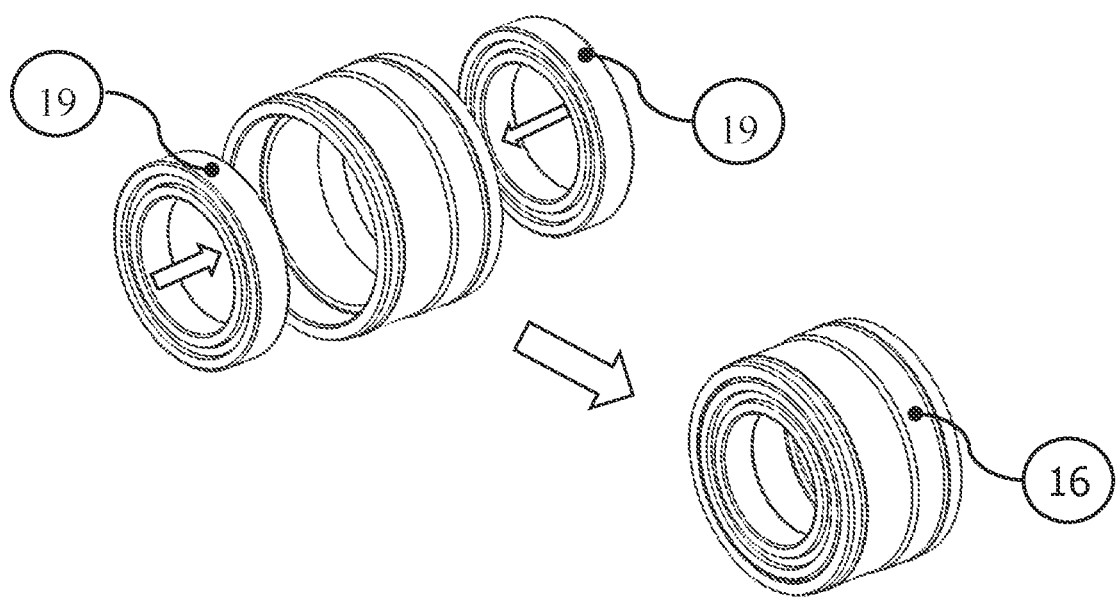
Figure 12:
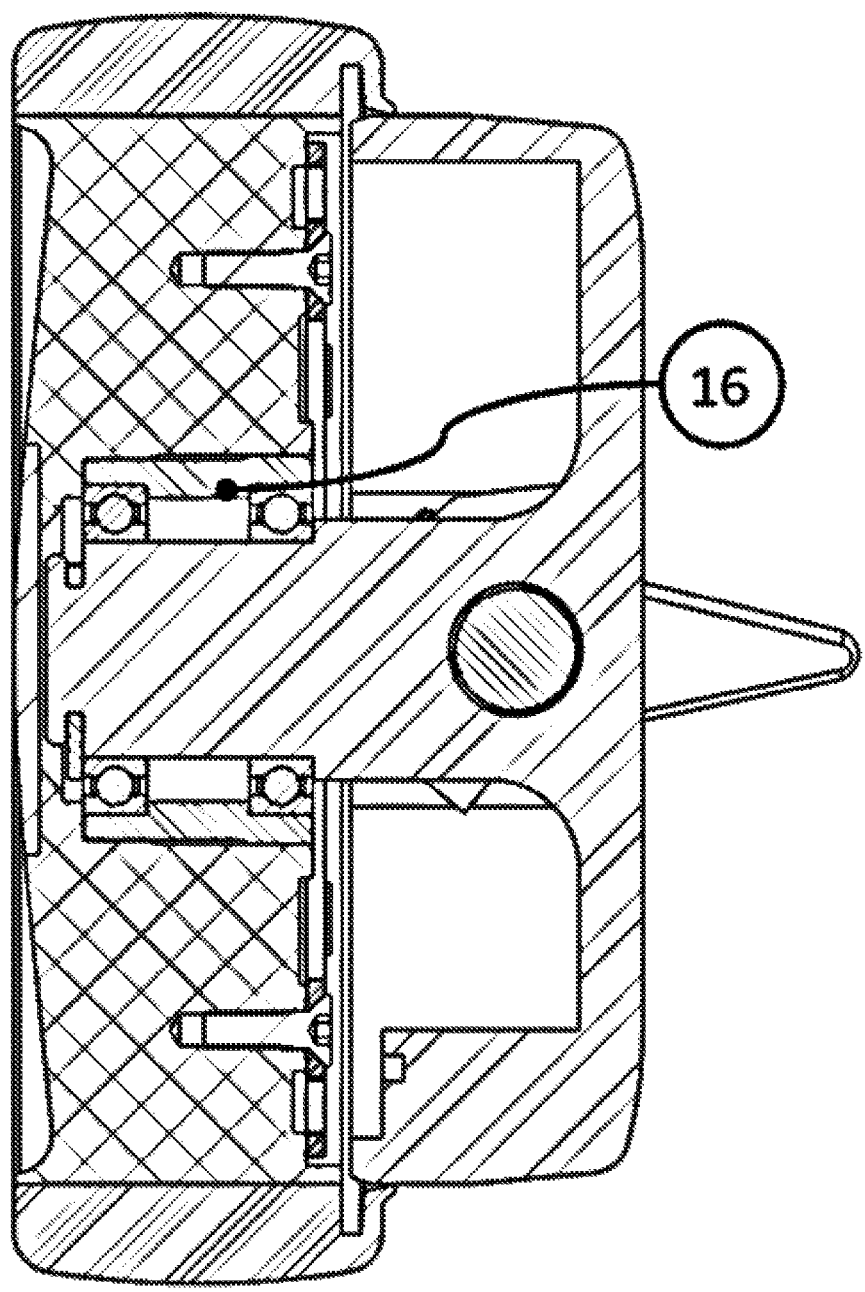
Figure 13:
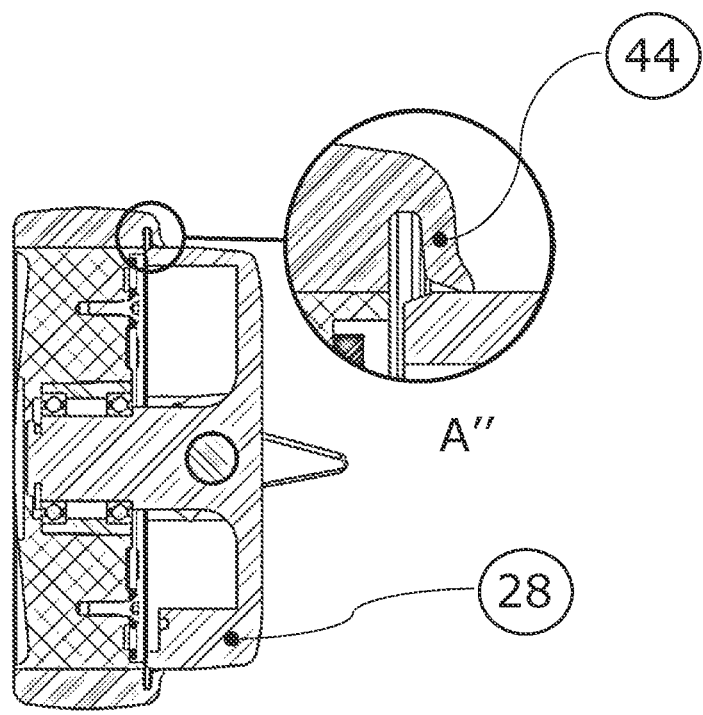
Figure 14A:
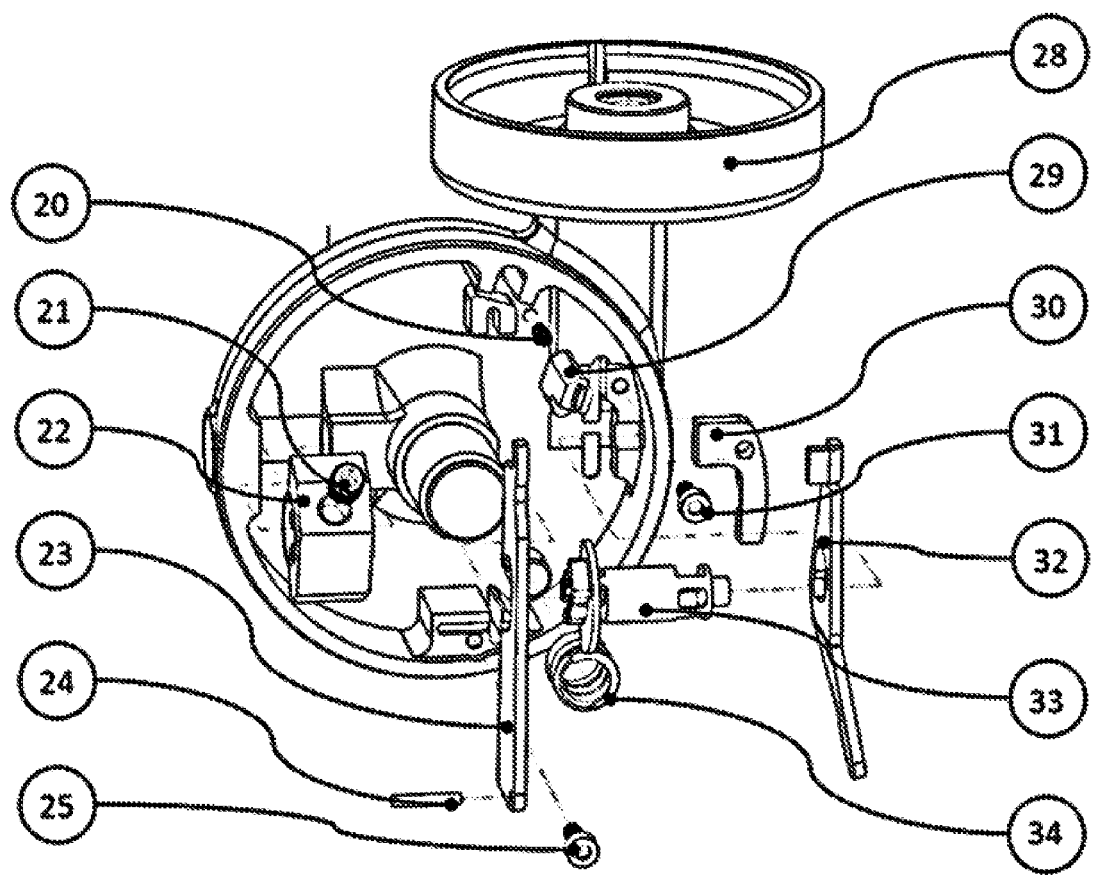
Figure 14B:
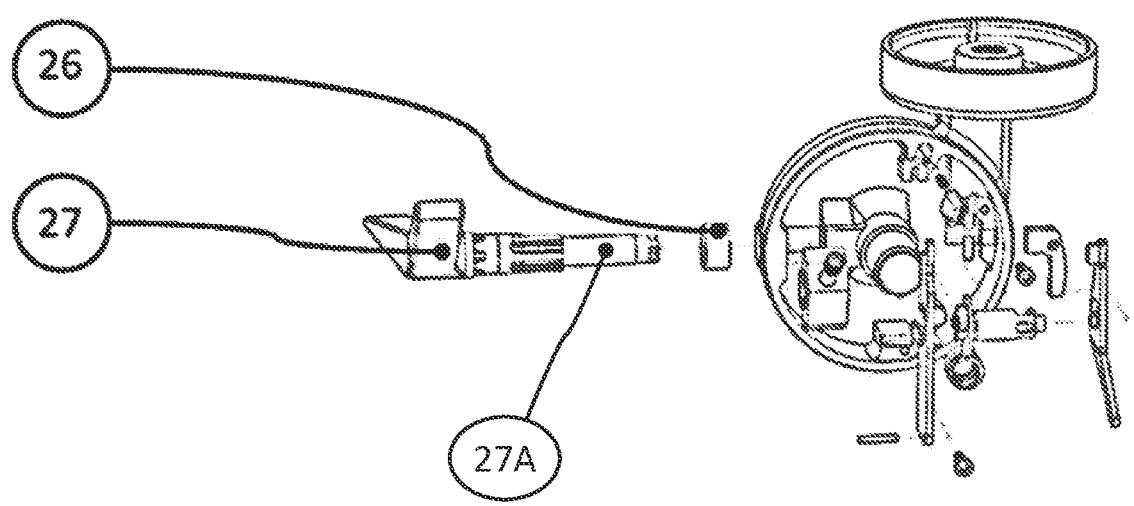
Figure 15:
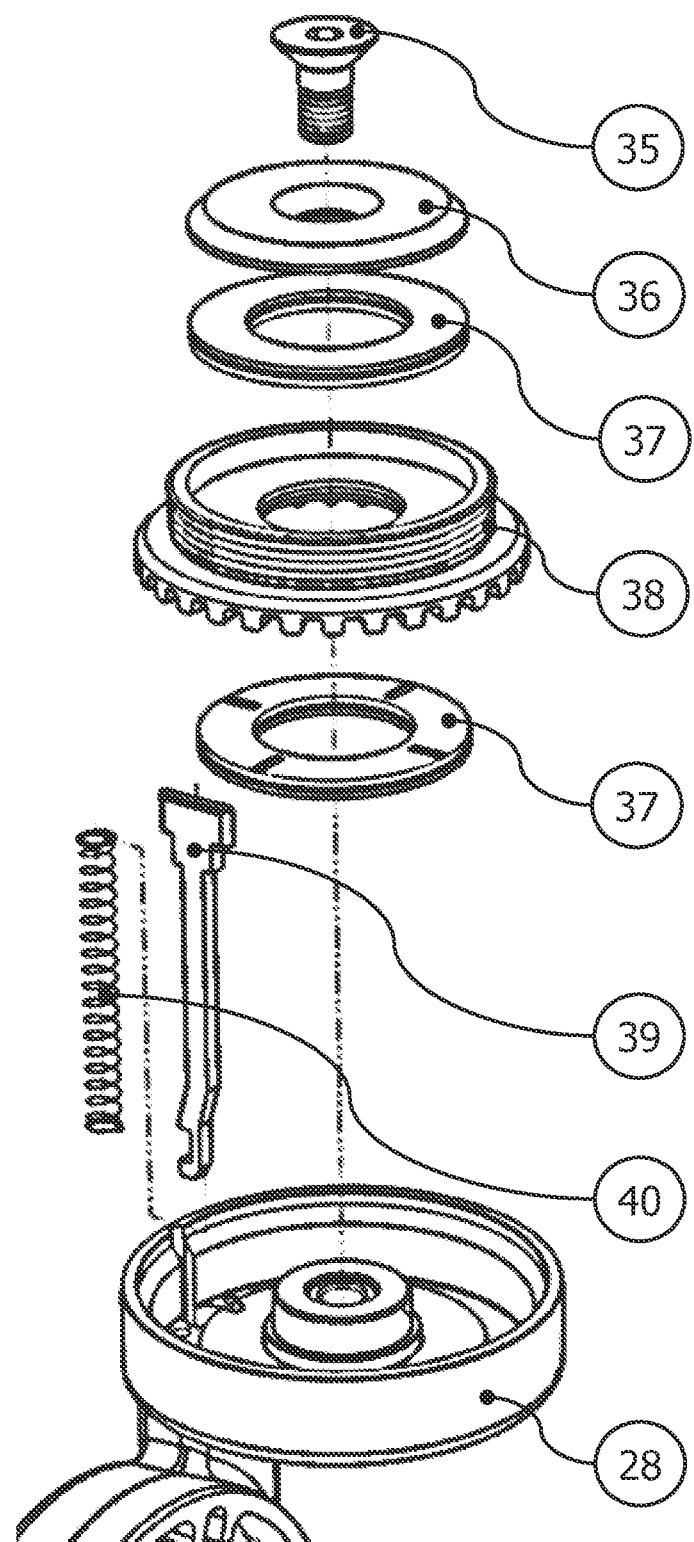
Figure 16:
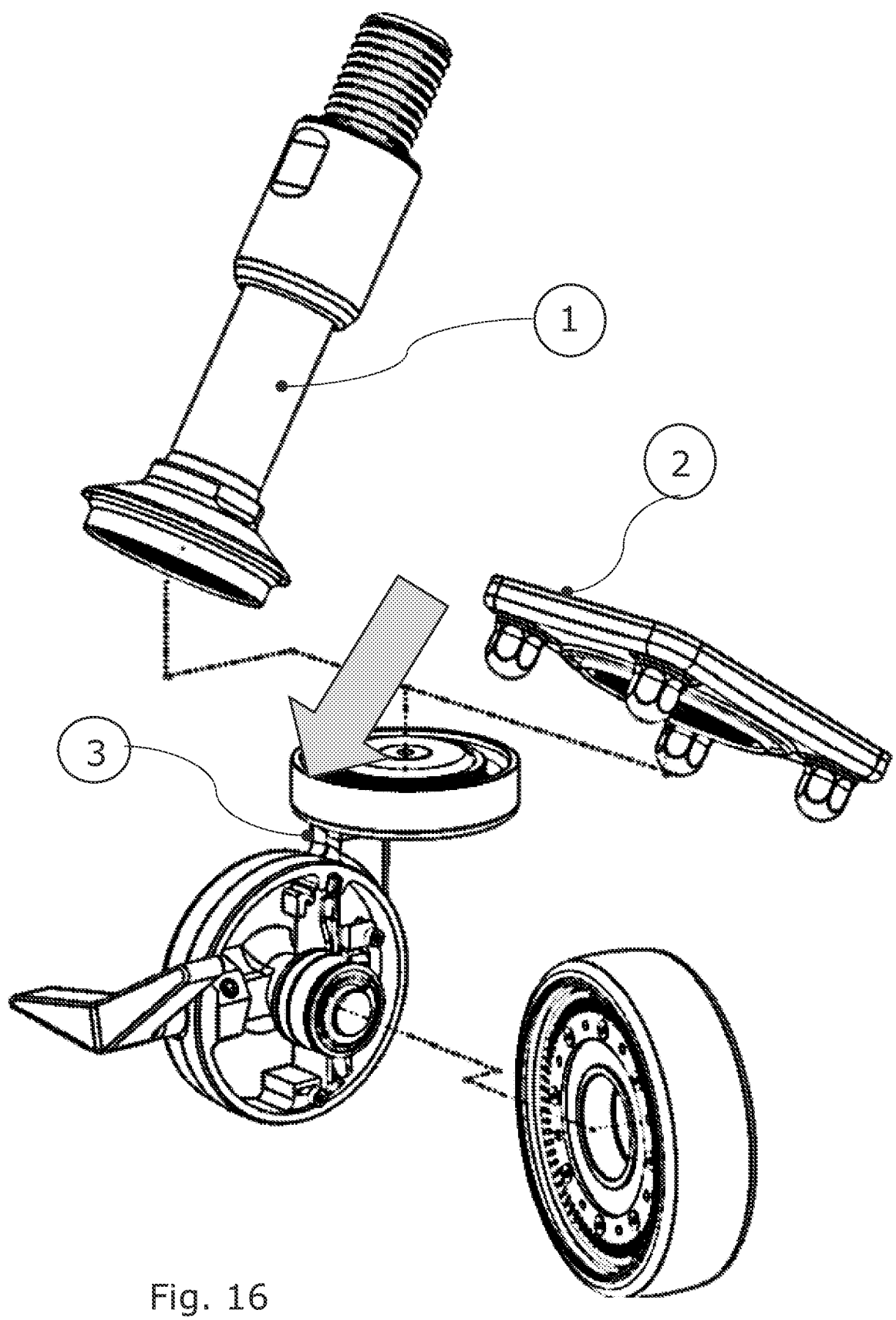
Figure 17:
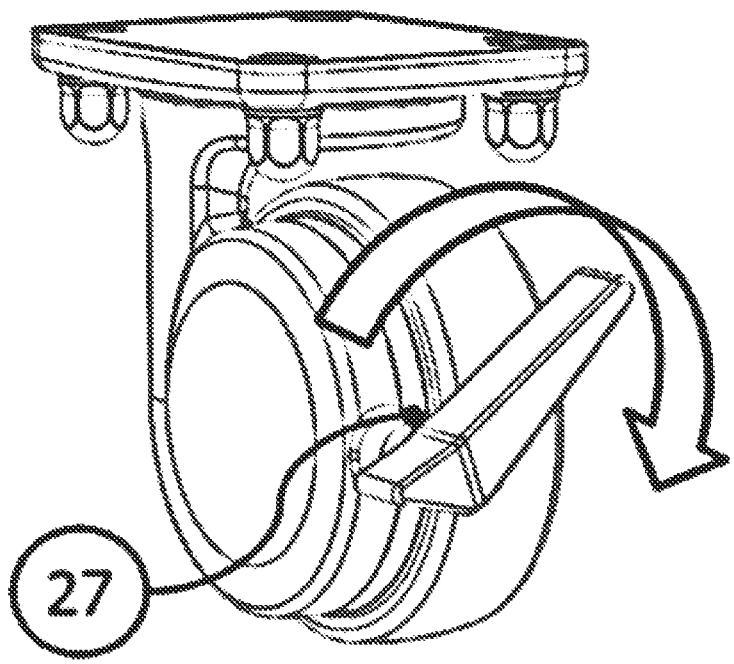
Figure 18:
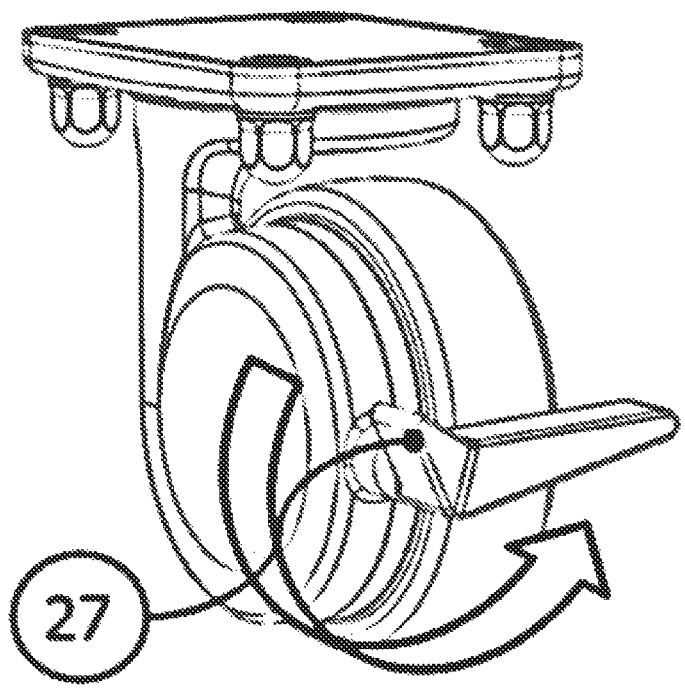
Figure 19:
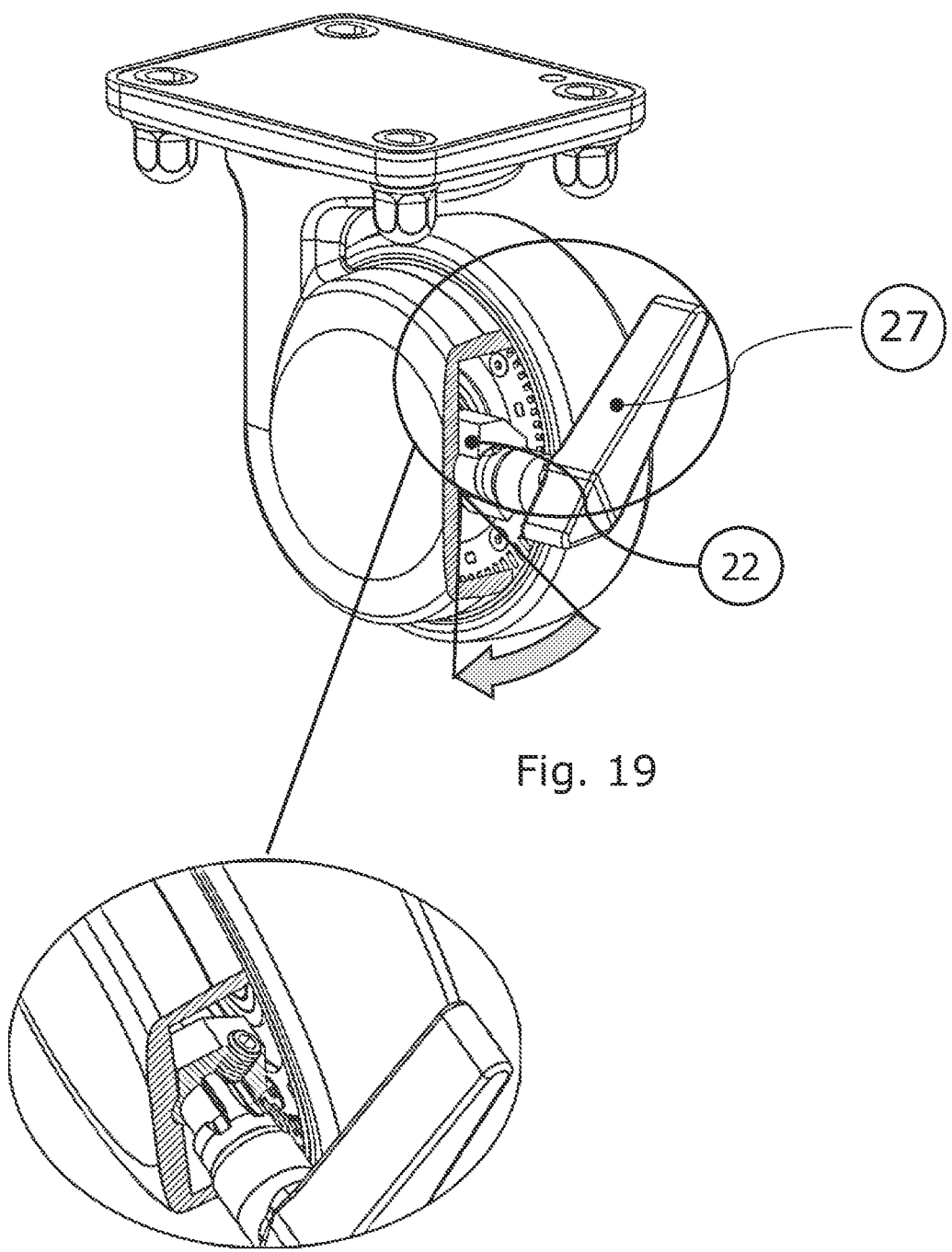
Figure 20:
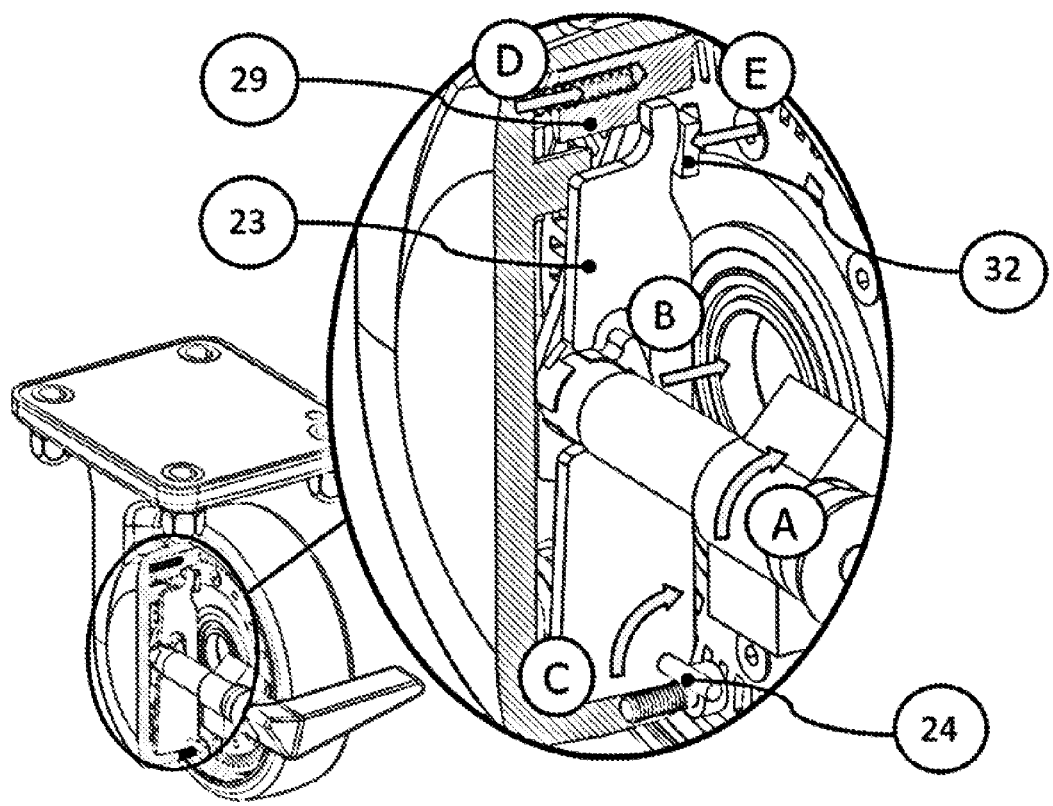
Figure 21:
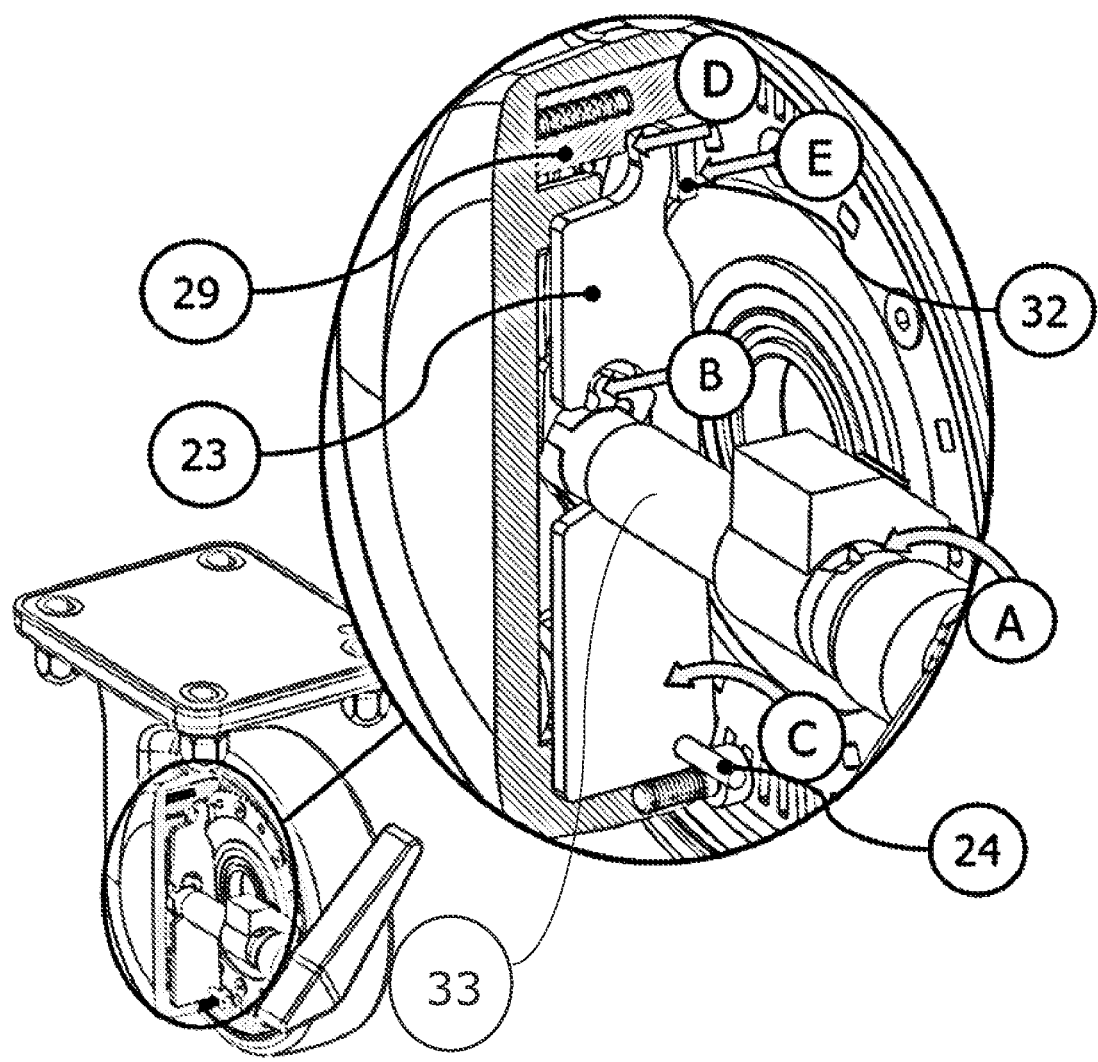
Figure 22:
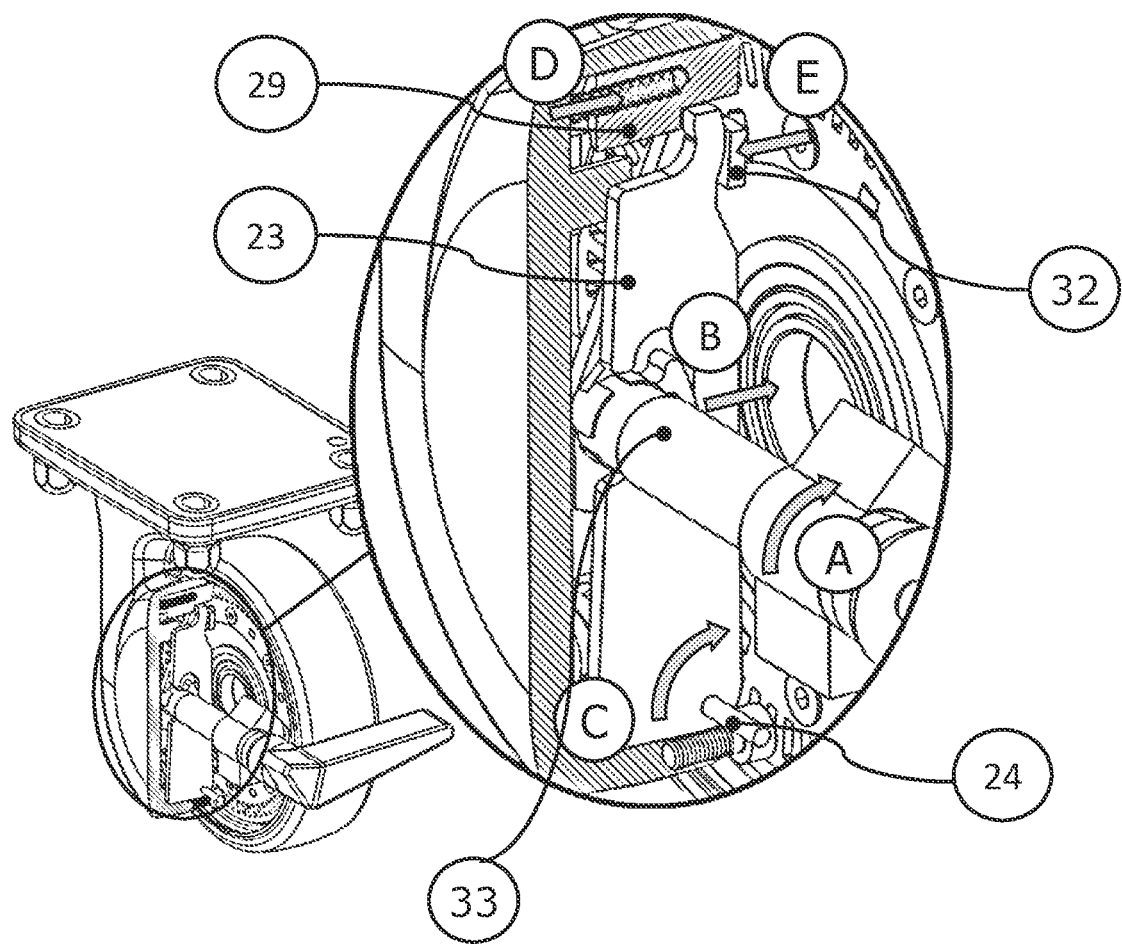
Figure 23:
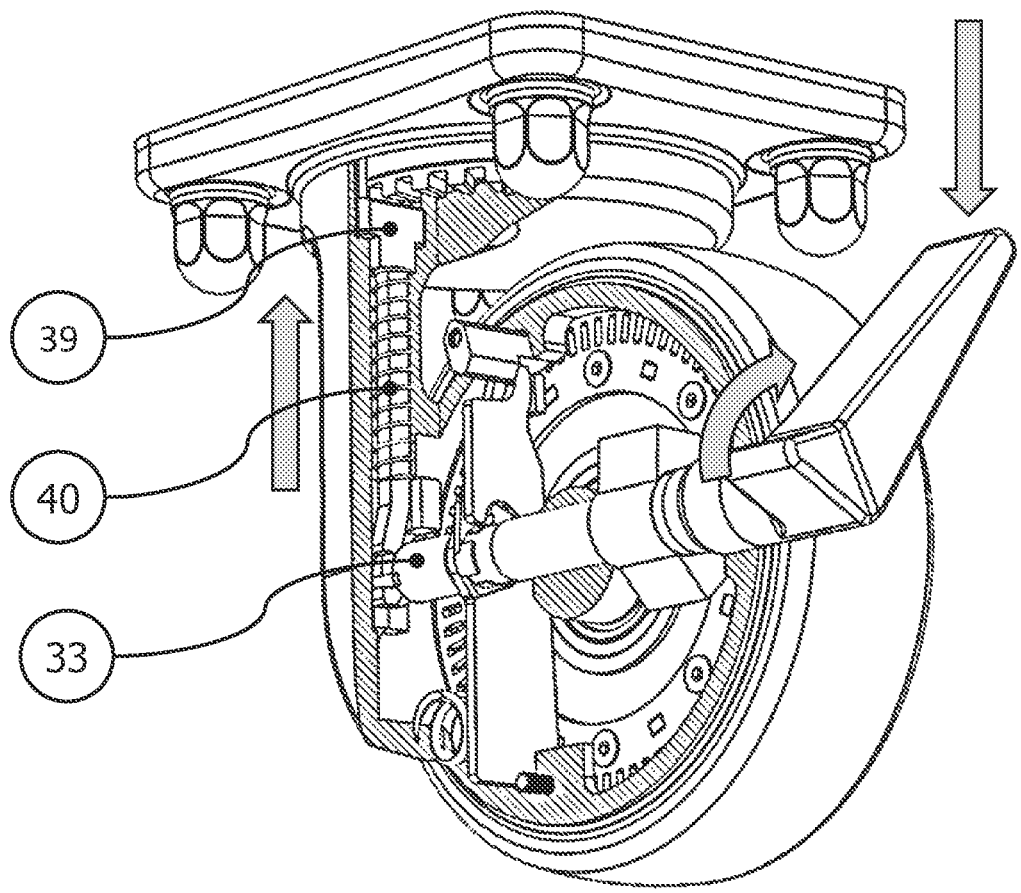
Figure 24:
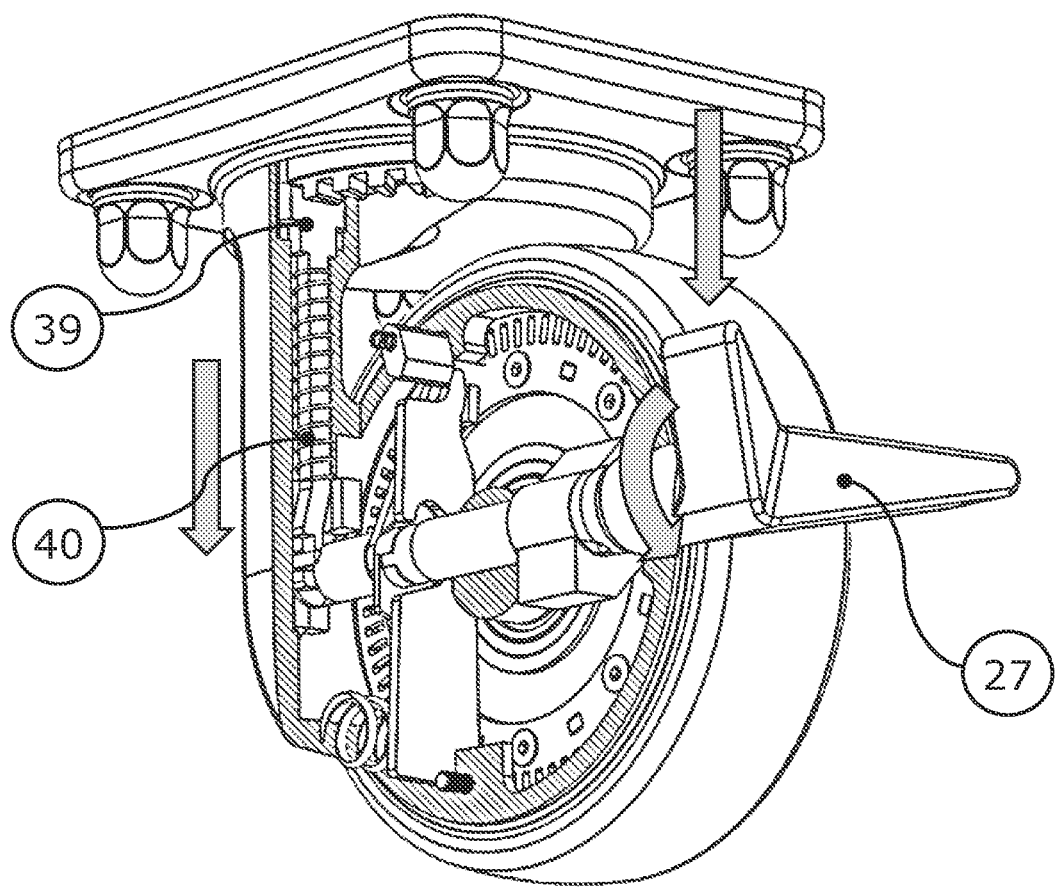
Figures 25A, 25B:
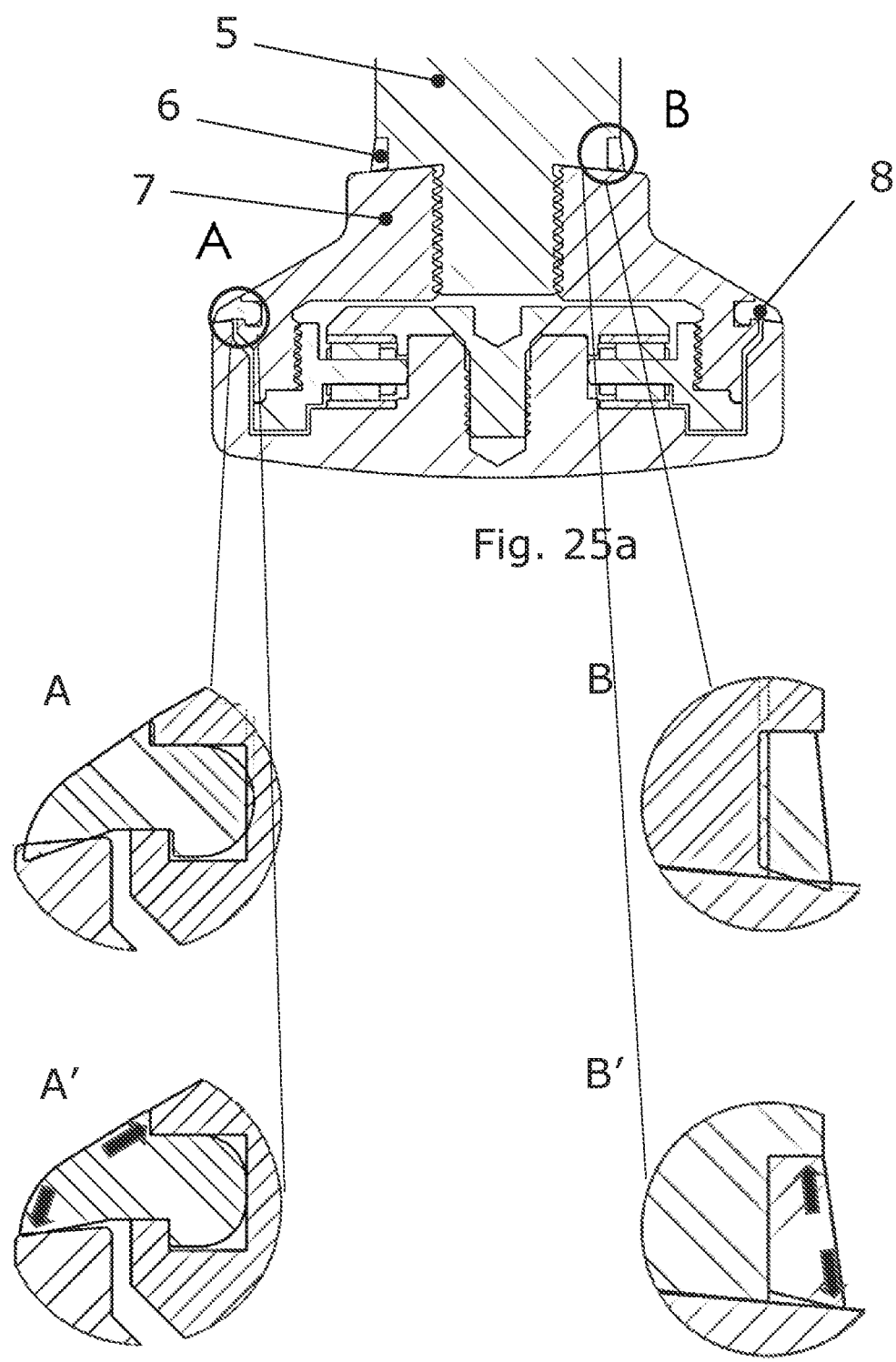
Figures 26A, 26B, 26C:
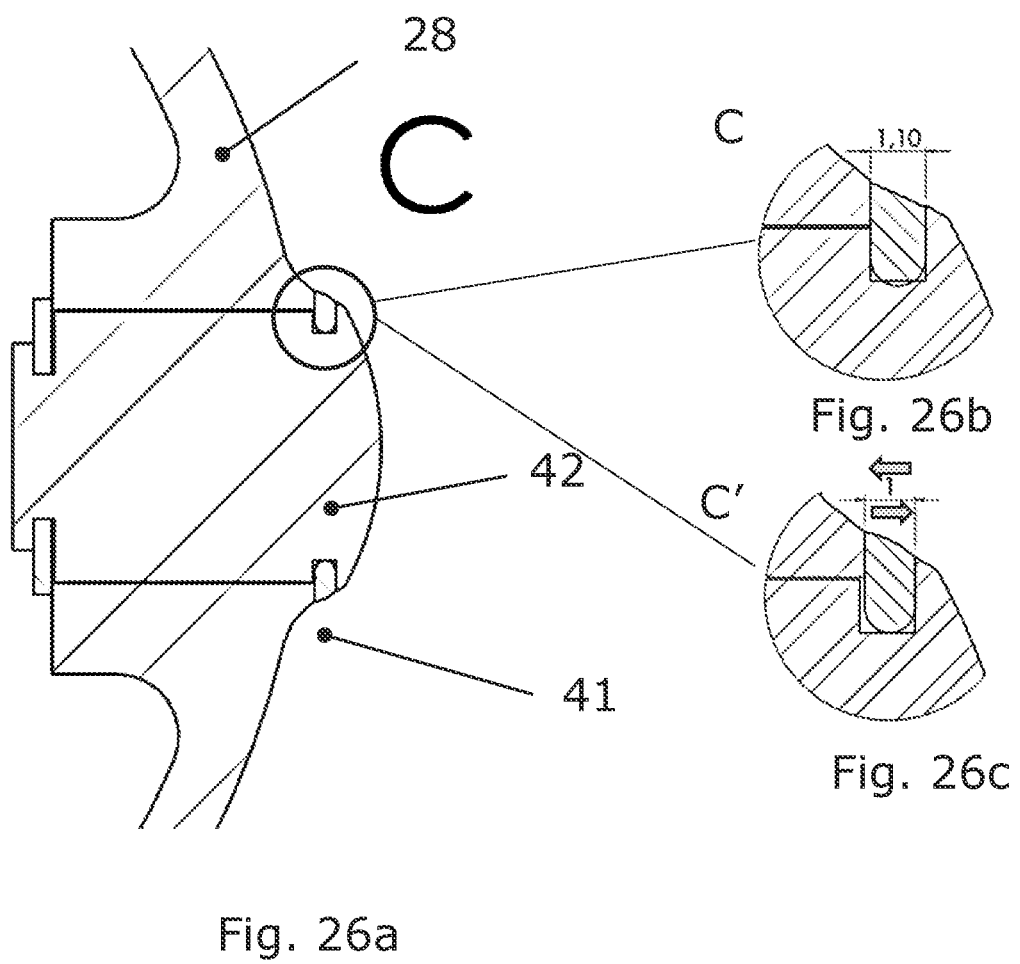

FIG. 7 shows an example of the individual parts of a castor wheel structure according to the invention, FIG. 8 shows an exploded view of the spindle structure according to the invention, FIG. 9 shows an exploded view of the flange structure according to the invention FIG. 10 shows a view of the wheel itself, FIG. 11a illustrates a cross section with sections in magnification of the mounted wheel, FIG. 11b shows the outer bearing ring positioned between two bearings, FIG. 12 shows how bearings are inserted in an outer bearing ring in an enlarged view, FIG. 13 shows the coating of the wheel hub, FIG. 14a shows the basic parts of a wheel house with brake function in an exploded view, FIG. 14b shows a pedal/shaft (brake pedal) structure in an exploded view in relation to the parts shown in FIG. 14a, FIG. 15 shows the parts of the turntable, FIG. 16 shows the individual main parts of the structure, FIG. 17 shows the crank in the unlocked position, FIG. 18 shows the crank in the locked position, FIG. 19 shows the limit stop, FIG. 20 shows the function at activation of the index arm and the wheel pawl, FIG. 21 shows the function at deactivation of the index arm and the wheel pawl, FIG. 22 shows the function of the spring arm, FIG. 23 shows activation of locking by means of the index pivot arm, FIG. 24 shows deactivation of locking by means of the index pivot arm, FIG. 25a shows a section of a joint between a spindle and the upper end of the castor wheel house with the sealing ring between the spindle and the pivot/spindle cap FIG. 25b shows the detail B of FIG. 25a in magnification in sections B and B', and the pivot sealing between the pivot/spindle cap and the turntable of the wheel house are shown in magnification in sections A and A', FIG. 26a shows a sealing structure, which is used when the castor wheel structure is to be used without brake arm, with a detail C.

Figure 27A:
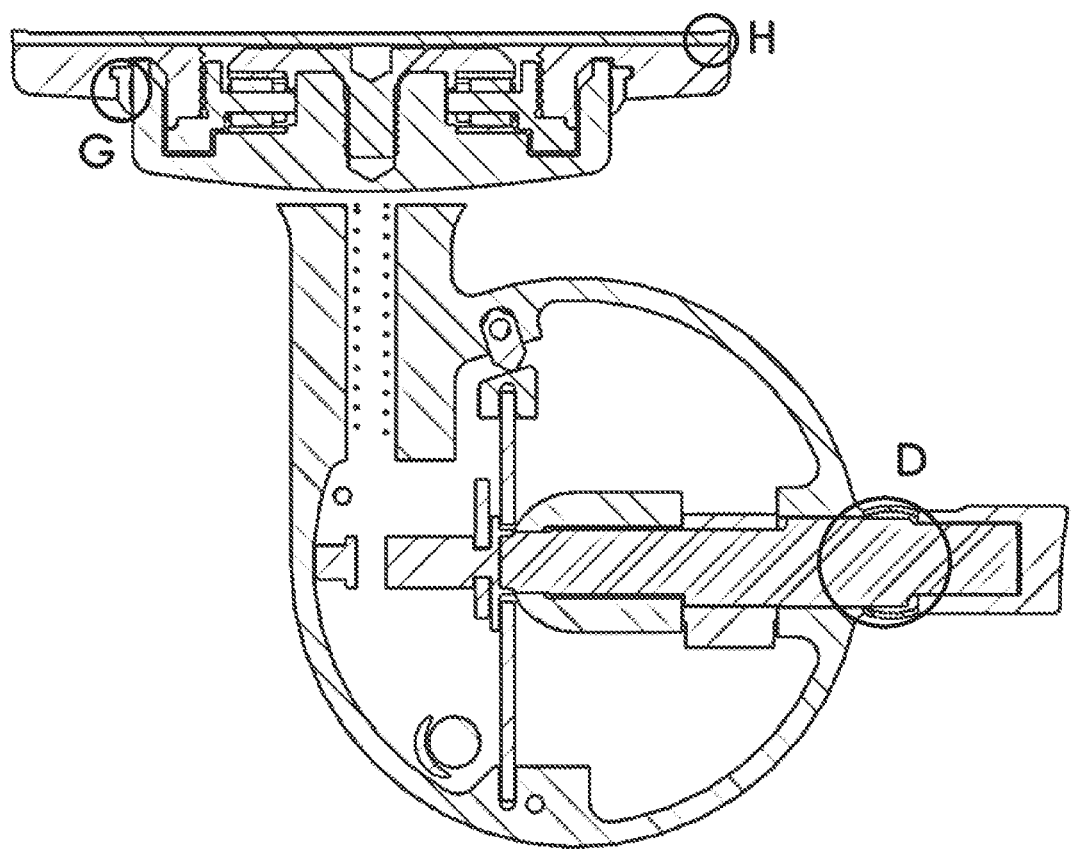
Figure 27B:
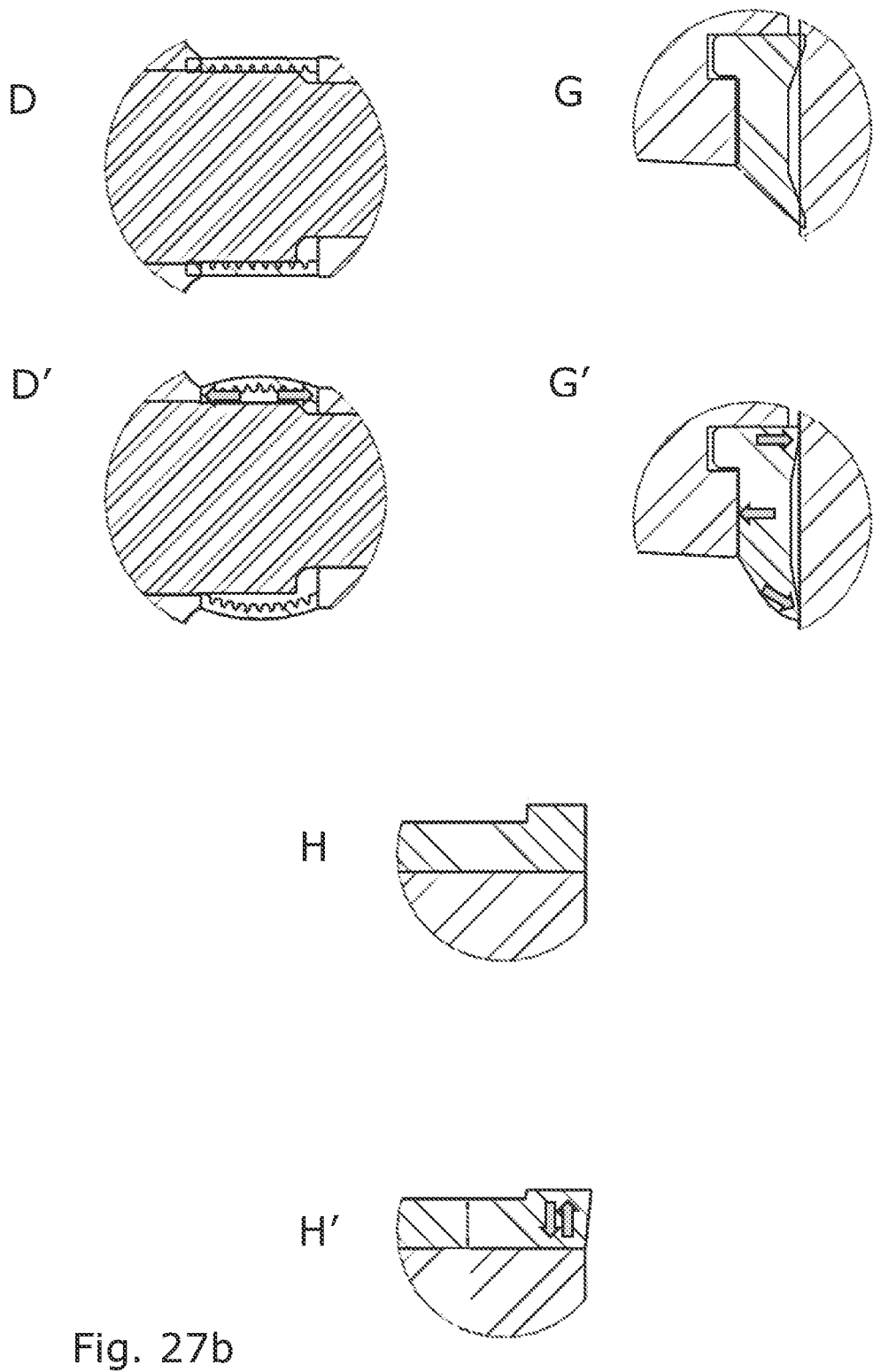
Figure 28A:
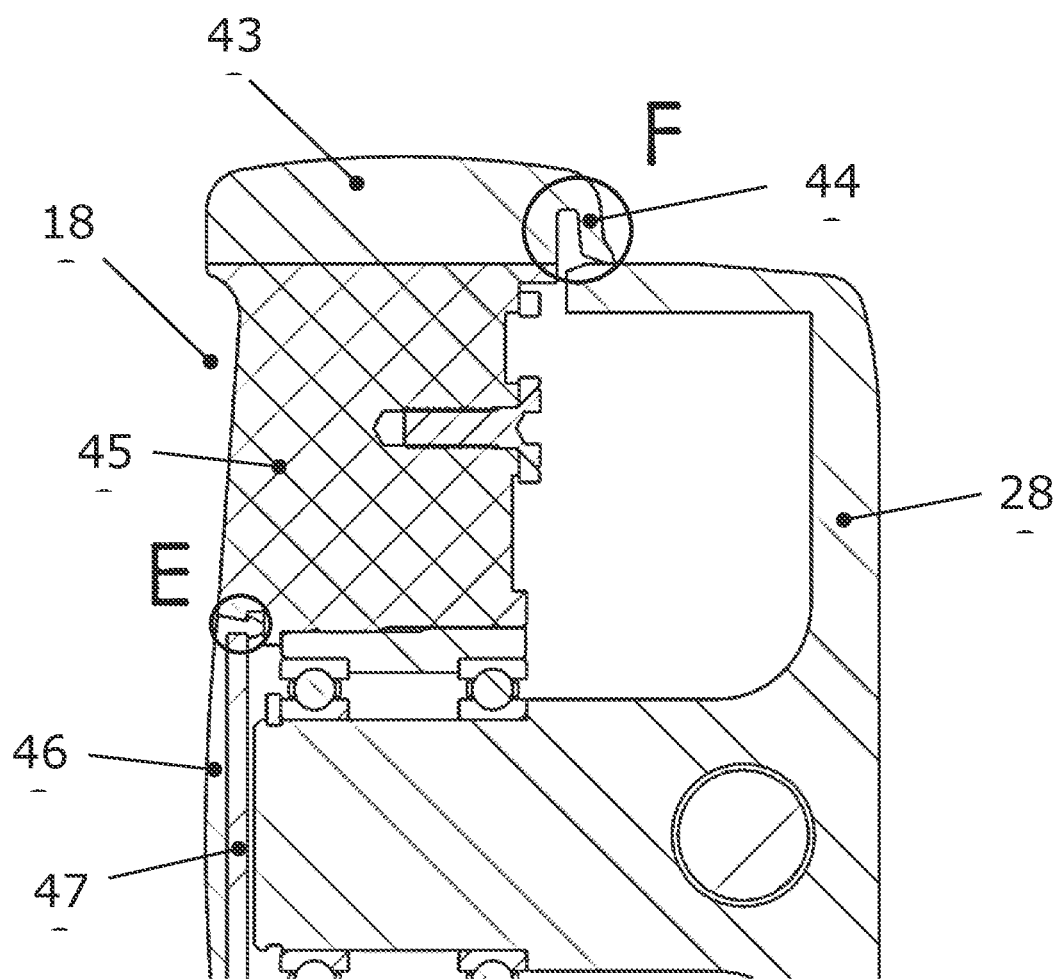
Figure 28B:
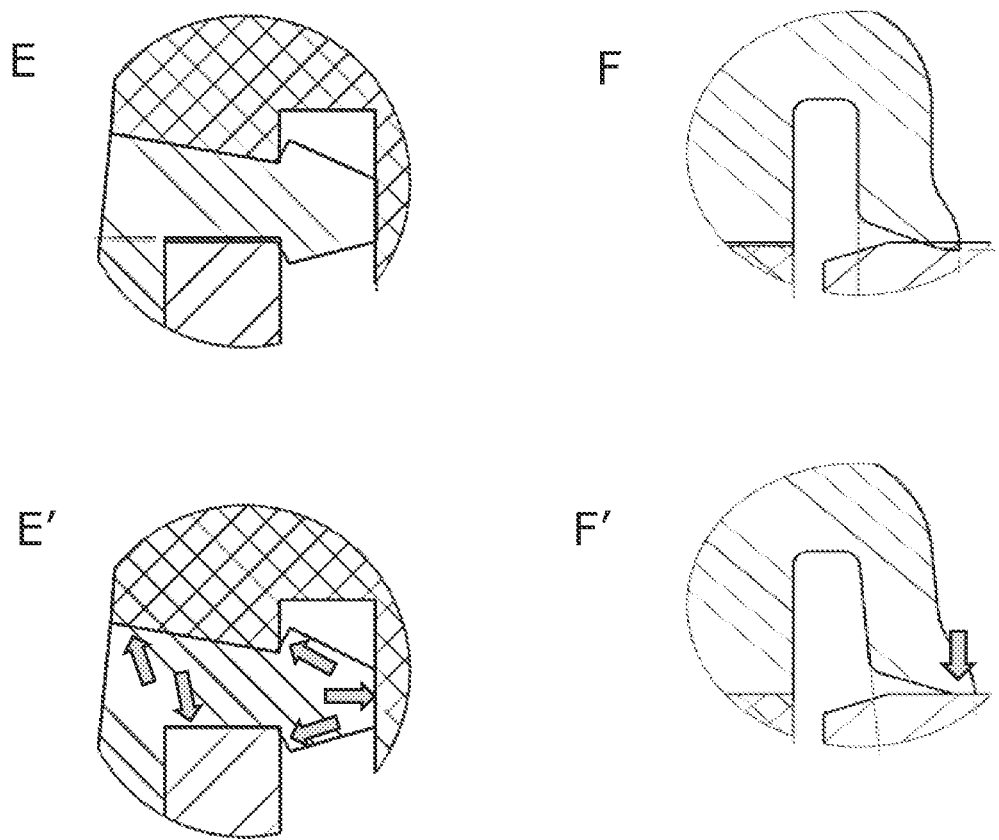

FIG. 26b shows detail C with reference to FIG. 26a,

FIG. 26c shows detail C' with reference to FIG. 26a,

FIG. 27a shows the positions of the details O, G and H of FIG. 27b,

FIG. 27b, in details D and D', shows a sealing structure, which is to be used when a brake arm is mounted, and moreover in sections H and H', a seal between the flange and the equipment is shown, and the pivot wiper seal is shown in sections G and G', FIG. 28a shows the positions of details E and F which illustrate in detail E the configuration of the transition between wheel rim and hub cap and in detail F that of the wheel covering and the wheel house, and FIG. 28b shows enlarged views of the details E (E and E') and F (F and F') the configuration of the transition between the sealing tongue of the wheel covering and the wheel house.

DETAILED DESCRIPTION

FIGS. 1-6 show various practical configurations of castor wheel structures according to the present invention. FIGS. 1-3 show embodiments with spindle attachment, and FIGS. 4-6 show embodiments with flange attachment. FIGS. 1 and 4 show castor wheel structures with brake, FIGS. 2 and 5 show structures without brake and with pivotally suspended wheels, and FIGS. 3 and 6 show structures with castor wheels that cannot turn. It is not possible to tell the difference from the outside between the two types in FIGS. 2 and 5 and in FIGS. 3 and 6, respectively, but the difference is that the swing or pivot movement is locked in the latter type.

FIG. 7 shows an example of a castor wheel structure according to the invention. The castor wheel structure consists of the following parts: A spindle structure 1 or a flange structure 2 and a castor wheel structure 3. Spindle or flange is selected depending on how the castor wheel structure is desired to be attached. The spindle 1 offers the possibility of height adjustment, but otherwise the function is the same regardless of the attachment method selected. Both the spindle and the flange structure is configured as hygienic elements, and the spindle can be provided with a cover, so there is no free thread. All surfaces have a Ra of maximum 0.8µ in the shown embodiment.

In FIG. 8, the spindle structure with the spindle 5 itself is shown in an exploded view. Reference numeral 4 indicates a case, and by reference numeral 6, a sealing ring is shown, which seals between the spindle 5 and a transition piece 7, which is also provided with a pivot seal 8. The transition piece is attached with a thread to the spindle, and the thread should preferably be secured against loosening by means of a form of thread security, such as Loctite®.

In FIG. 9 the flange structure is shown in an exploded view. Reference numeral 9 indicates the sealing between the flange 10 itself and the equipment that is to be made mobile. Under the flange 10, a pivot wiper seal 11 is mounted. The flange is attached by means of hygienic nuts 13, on which seals 12 are arranged.

The wheel itself is shown in FIG. 10. It is mounted on the castor wheel structure by means of a wheel bearing joint 16, which is attached with a shaft locking ring 17. Here the wheel 18 is shown from both the outside and the inside. The choice of bearing for the structure is of great importance in terms of price and use. In addition to the wheel path, the wheel diameter and the pivot bearing, the wheel bearings are of crucial importance to the maneuverability and hence the quality of the castor wheel. There are obviously different requirements for wheels to be used as wheels for furniture in the home and those that are to be used in commercial businesses. Likewise, different other requirements apply to the wheels under waste collection containers, hospital beds and for instance shopping trolleys, and quite different requirements to wheels used for transporting heavy cargoes at a factory, and it is of crucial importance that the choice of bearing is adapted to the relevant use.

To be able to avoid static electricity, which may cause discomfort for the users when synthetic material is charged by friction, and the charged voltage cannot be discharged, so the discharge takes place through the user, the structure is advantageously provided with electrically conductive wheels with a discharging resistor that is lower than 10,000 ohm. Hereby it is also ensured that the risk of explosion, for instance as a consequence of ignition of explosive gases and explosive dust, can be minimized.

FIG. 11a shows a cross section with sections in magnification of the mounted wheel, and FIG. 11b shows how the bearings 19 are inserted in the outer bearing ring 16. At detail B" of FIG. 11a, it appears that a ring bead is provided, which in cross section is shaped as a wedge with barb, on the outer side of the bearing ring 16. The bead creates a track, which, as the bearing ring 16 is squeezed in, is formed on the inner side of the wheel hub. Hereafter the bead functions as a barb, which ensures that the parts cannot be separated easily.

As stated above, the choice of bearing should be adapted to the relevant intended use. In the preferred embodiment, two deep groove ball bearings are used, ensuring the best relationship between rolling friction and carrying capacity. Angular contact ball bearings, roller bearings or sliding bearings can also be used. Angular contact ball bearings and roller bearings are used when special requirements apply, while the sliding bearing will be the cheapest solution, which can be used for equipment that is to be moved at low speed and over short distances.

As appears from FIG. 13, the covering of the wheel hub has a double function. It functions both as tire and seal. As shown at detail A", one side of the covering is provided with a tongue that extends towards the wheel house and provides protection against moisture and other contamination. It must be ensured that the abutment pressure is so low that the roller friction is not substantially affected and still so strong that the tightness is ensured. Thus, the wheel part seal between the wheel part and the castor wheel house is configured as a tongue, wherein the tongue tapers away from the wheel part to smoothly engage an outermost surface of the castor wheel house without any gaps between the outermost surface of the castor wheel house and an outer surface of the wheel part.

FIG. 14a shows the basic parts of a wheel house 28 with brake function in the exploded view with the brake pedal 27 shown in exploded view in FIG. 14b in relation to the view of FIG. 14a. At assembly of the parts of the wheel house 28, the parts are assembled in groups in the following manner: The wheel index pawl 29 with spring 20 is mounted in the wheel house together with a pull-out auxiliary spring 34. Hereafter the group that consists of a camshaft 33 with two flat arms, respectively, the wheel spring arm 32 and the wheel index arm 23, with a wheel index stud 24 inserted. All parts are placed in the wheel house 28. Hereafter the wheel index stud 24 is fastened with a screw 25. Then an index pivot spring 40 is led over an index pivot arm 39, which is guided down into the leg of the wheel house until it catches a pin on the camshaft 33. Then the locking plate 30 is fastened with a screw 31 to retain the index pivot arm 39 and the camshaft 33 in the house. Hereafter a pointed screw 21 is screwed into a limit stop 22, which is put in position in the wheel house 28. Then a pedal/shaft gasket 26 is led over a pedal/shaft structure 27. The two parts that the pedal/shaft structure consist of, i.e. a pedal and a shaft, are for instance assembled with a multiple-spline socket and Loctite®, but it is possible to use other assembly methods such as cone and pin. Hereafter the pedal/shaft structure 27 is pushed into the wheel house until the shaft's multiple-spline socket has caught the limit stop and the camshaft 33. Hereafter the top part remains, which is the turntable, on which the spindle or the flange is to be mounted. The parts of the turntable are illustrated in FIG. 15. Before mounting the turntable, the parts are placed on top of each other. At the bottom a needle bearing 37 is placed and on top of that an index pivot disc 38 and subsequently yet another needle bearing, and above this a pivot friction disc 36 is placed. When the other groups are mounted in the wheel house, the camshaft structure is screwed onto the the uppermost part of the wheel house by means of a countersunk screw 35.

FIG. 16 shows the individual main parts of the structure. On top of the assembled wheel house structure, either a spindle structure 1 or a flange structure 2 can be mounted and possibly retained with a thread lock, such as Loctite®, which is added where indicated by the large arrow. When the wheel structure has been clicked on, the castor wheel structure is ready for use.

The assembled castor wheel structure has the following functions. The brake can be activated by pressing on the long end of the crank 27. FIG. 17 shows the crank in the unlocked position. During the first part of the movement, there will be slight springy resistance, and thereafter a small, more pronounced resistance will be felt, and lastly a perception of locking in a notch. How to achieve the special perception of the individual steps is described in detail below.

Deactivation of the brake is obtained by pressing the short part of the crank. FIG. 18 shows the crank in the locked position. During the first part of the movement, there is a slight resistance and thereafter a perception of a springy jump backwards. Achieving the special perception of the individual steps of deactivation will also be described in detail below together with an explanation of how the brake actually works, and how it can resist intense impacts from all sides without slipping or letting go.

As regards both wheel and pivot brakes, there is a possibility that they can lock rotation with a pawl between index teeth and index holes in the wheel when they are activated. If they do not do that directly, a very small shift will cause the pawl to slot into place and lock. The brake backlash corresponds to +/−½% or +/−0.57 degrees before complete locking. When the brake is deactivated, the pawl is pulled out with the rotational movement, but not at the first part of the movement as the wheel pawl is helped to be pulled out. This procedure will also be explained in the following.

Reference is now made to FIG. 19, where the function of the limit stop 22 will be explained. On braking the pedal is activated by a person, who presses down the long crank with a foot. The movement and the force are transferred through the shaft to the limit stop. This force can be quite powerful, and the structure is designed to an expected pressure of 2000 N. The limit stop 22 is therefore provided with a multiple-split socket, which can transfer the intense forces to the wheel house. The limit stop has an additional function, namely locking of the pedal shaft in axial direction, which is effected by the pointed screw after assembly.

Referring to FIG. 20 (activation) and FIG. 21 (deactivation), the function of the index arm 23 and the wheel pawl 29 will be explained below. At activation, a pressure on the long crank will cause the pedal/shaft to carry out a rotational movement (A) clockwise, and the top pawl of the camshaft to press (B) against the index arm, which turns (C) about the index stud 24 and removes the pressure from the index wheel pawl 29. The pawl is pressed (D) by the spring against the index wheel and will, when it is possible, find its way into a notch and lock the wheel. The rotational movement constantly gets resistance (E) from the index spring arm 32 behind the index arm 23, and this gives the user a perception of locking something. If the help exceeds the resistance by pressing out the index wheel pawl 29, the pawl of the camshaft only functions as lock when the brake is deactivated.

As illustrated in FIG. 21, a pressure on the short crank will cause the pedal/shaft to carry out a rotational movement (A) counter-clockwise, and the pawl of the camshaft to press (B) against the index arm, which turns (C) about the index stud 24 and puts pressure (D) on the index wheel pawl 29, which is pressed out by the index wheel. The rotational movement constantly gets help (E) from the index spring arm 32 behind the index arm 23. If the help exceeds the resistance by pressing out the index wheel pawl 29, the pawl of the camshaft will only function as lock when the brake is deactivated.

Reference is now made to FIG. 22, where the function of the spring arm 32 will be explained. The spring arm 32 turns about the camshaft and the pedal/shaft without any other connection than the shaft being used as pivot shaft. The spring 34 presses against the arm at one end and thus transfers a corresponding pressure to the other end against the index arm 23, which again presses on the index wheel pawl 29.

FIG. 23 shows that the pedal for activation of the lock by means of the index pivot arm 39 rotates clockwise and thereby the camshaft 33 also rotates clockwise, and the pawls will seek to slot into place, and when they do, both the pivot and wheel will be locked. The spring 40 has given the movement resistance and has been tensioned until the end position, where the spring retains the pedal in the outer position clockwise. The stop limit is configured to be so robust that it can withstand full load from the user.

For deactivation of locking by means of the index pivot arm, the pedal rotates, as shown in FIG. 24, anti-clockwise and forces out first the pivot pawl and then the wheel pawl. The spring facilitates the movement. As outlined above, the robust configuration of the stop limit ensures that full load from the user can be withstood.

With the present structure, a hygienic structure with a minimal number of seals can be obtained. The spindle solution requires a seal 1) between equipment and spindle case, 2) between spindle and pivot/spindle cap, 3) between pivot/spindle cap and turntable of the wheel house, 4) between wheel and wheel house and 5) between brake shaft and wheel house. The flange solution requires a seal 1) between equipment and flange, 2) between flange and nuts, 3) between flange and turntable of the wheel house, 4) between wheel and wheel house and 5) between brake shaft and wheel house. The preferred choice of sealing material is NBR (NNF-85), but for instance silicone can also be used. Seals and their preferred configurations are described in the following.

FIG. 25a shows a section of a joint between a spindle 5 and the upper end of the castor wheel house with the sealing ring 6 between the spindle and the pivot/spindle cap (shown in magnification in sections B and B" of FIG. 25b), and the pivot sealing between the pivot/spindle cap and the turntable of the wheel house (shown in magnification in section A of FIG. 25b). By reducing the distance between the faces and cavities, in which the sealing rings are arranged, to be suitably smaller than the size of the sealing ring, it is, as appears, obtained that the seals are under constant and controlled pressure (shown in broad arrows in sections A' and B' of FIG. 25b). In this way, the desired compression and hence the desired sealing effect is obtained. The outer surface is out of consideration for hygiene/easy cleaning configured with a view to providing the best possible protection against germ accumulation in the sealing structure.

FIG. 26a shows a sealing ring 41, which is used when the structure is to be used without brake arm. This seal thus provides sealing between the castor wheel house 28 and an inserted plug 42, and the sealing principle is shown in magnification in details C and C' of FIGS. 26b and 26c, respectively.

When a brake arm is used as in FIG. 27a, it must be sealed as shown in details D and D' from FIG. 27b. Here the sealing 9 is also indicated (see also sections H and H' from FIG. 27b) between the flange 10 and the equipment that is to be made mobile, and the pivot wiper seal 11 (see also sections G and G' from FIG. 27b).

The seal between the wheel 18 and the wheel house 28 is illustrated in FIG. 28a and is, as mentioned above, secured by means of the coating or tire 43, which is configured integrally with a tongue, here designated with reference numeral 44. This coating may also be made of massive NBR, but in the preferred embodiment it is made of non-marking blue polyurethane. The coating or the wheel path 43 can also be manufactured of polyurethane with thread-guards (electrically conductive) or of thermoplastic rubber. It is common for the types that they provide the necessary sealing effect without the friction between the tongue 44 and the wheel house 28 becoming too large.

Details E and E' in FIG. 28b show the configuration of the transition between the wheel rim 45 and the hub cap 46, which keeps a spacer 47 in place and details F and F' show the configuration of the transition between the sealing tongue 44 and the wheel house 28. The wheel rim 45 is preferably manufactured of polyamide (PA6), but can for instance also be manufactured of corrosion-proof 304 steel or electrically conductive polyimide or polypropylene. Electrically conductive materials are selected if discharge for avoiding static electricity is desired.

As appears from the above, it is advantageous that all seals are made specifically for such use. Thus the possibility is obtained of having completely smooth surfaces that are easy to wash and inspect and which minimize the risk of accumulation of dirt.

It should be understood that here the invention is configured and described to reflect that it will normally be used as a standard element, which can be directly mounted on various types of equipment. However, it should be understood that the invention can also be integrated with the equipment in such a manner that transition elements are avoided without being outside the scope of the invention.

It should also be understood that it is not necessary that the wheel house contains functionalities, which are not used in some cases, but for practical and aesthetic considerations, it may be expedient to use the same house and wheels for all castor wheel structures according to the invention.

REFERENCE NUMERALS

1 Spindle structure
2 Range structure
3 Castor wheel structure
4 Case
5 Spindle
6 Sealing ring
7 Transition piece
8 Pivot sealing
9 Flange/equipment sealing
10 Range
11 Pivot wiper seal
12 Sealing for hygienic nut
13 Hygienic nut
14 -
15 -
16 Wheel bearing joint
17 Shaft locking ring
18 Wheel
19 Bearings
20 Spring for wheel index pawl
21 Pointed screw
22 Limit stop
23 Wheel index arm
24 Wheel index stud
25 Inner hexagon-headed screw
26 Pedal-shaft gasket
27 Brake pedal
27a Brake shaft
28 Wheel house
29 Wheel index plate
30 Locking plate
31 Inner hexagon-headed screw
32 Wheel spring arm
33 Camshaft
34 Pull-out auxiliary spring
35 Countersunk screw
36 Pivot friction disc
37 Needle roller bearing
38 Index pivot disc
39 Index pivot arm
40 Index pivot spring
41 Sealing ring
42 Plug
43 Wheel covering (tyres)
44 Sealing tongue
45 Wheel rim
46 Hub cap
47 Spacer

The invention claimed is:

1. A castor wheel structure, comprising a wheel part and a castor wheel house, and further comprising a transition element comprising a spindle attachment or a flange attachment mounted on the castor wheelhouse such that the castor wheel structure is mountable on equipment to provide mobility to the equipment, wherein the wheel part is unilaterally suspended and arranged about a horizontal shaft on the castor wheel house, wherein the castor wheel structure also comprises a transition element seal between the transition element and an upper part of the castor wheel house, wherein the transition element seal is configured with contours that are adapted to the castor wheel structure to provide continuous surfaces, wherein the castor wheel structure further comprises a wheel part seal between the wheel part and the castor wheel house, wherein the wheel part seal is configured with contours, that are adapted to the castor wheel structure to provide continuous surfaces, wherein the wheel part seal between the wheel part and the castor wheel house is configured as a tongue, wherein the tongue tapers away from the wheel part to smoothly engage an outermost surface of the castor wheel house without any gaps between the outermost surface of the castor wheel house and an outer surface of the wheel part.

2. The castor wheel structure according to claim 1, wherein the seal between the wheel part and the castor wheel house is fixably mounted on either the wheel part or the castor wheel house and has sliding abutment, respectively, with either the castor wheel house or the wheel part.

3. The castor wheel structure according to claim 1, wherein the tongue is an integral part of a tire part of the wheel part.

4. The castor wheel structure according to claim 1, wherein the transition element is a spindle, and it is equipped with a sealing ring that provides sealing between the spindle and a transition piece that is also equipped with a pivot seal between the transition piece and the castor wheel house.

5. The castor wheel structure according to claim 1, wherein the transition element is a flange structure, and it is provided with a top seal for providing a sealing between an uppermost part of the flange structure and the equipment, and with a bottom seal under the flange structure, wherein the flange structure is attachable to the equipment by means of nuts with seals placed upon them.

6. The castor wheel structure according to claim 1, wherein the seals are arranged in a periphery and are configured with surfaces, which provide smooth, soft transitions, and the seals are activated and kept in place by being retained with pressure in tracks and cavities wherein they are mounted.

7. The castor wheel structure according to claim 1, wherein all outer surfaces are smooth with an Ra maximum of 0.8µ, self-draining and provided with bending radiuses of at least 3.2 mm.

8. The castor wheel structure according to claim 1, wherein for inner braking of the wheel, the castor wheel structure comprises a brake shaft fitted with a crank, and the brake shaft is provided with a seal that provides sealing between the brake shaft and the castor wheel house.

9. The castor wheel structure according to claim 8, wherein the brake shaft is operable to brake a rotational movement of the wheel, a pivot movement of the wheel, or both the rotational movement and the pivot movement of the wheel.

10. The castor wheel structure according to claim 8, wherein the brake shaft has connection with a camshaft for activating and deactivating a pawl system that, in connection with index plates locks the wheel movement, the pivot movement, or both.

11. The castor wheel structure according to claim 10, wherein the camshaft provides for both activation and deactivation of the braking of the wheel by means of a wheel spring arm and a wheel index arm, and by means of a slot-shaped control of the wheel spring arm and the wheel index arm.

12. The castor wheel structure according to claim 11, wherein the wheel spring arm and the wheel index arm are provided with pawls for engagement with the index plates and with encompassing springs that contribute to correct activation of the brake and that contribute to giving the user a tactile feedback when the brake is activated and deactivated.

13. The castor wheel structure according to claim 8, wherein the brake shaft is provided with a mounted solid limit stop that limits oscillation both on activation and deactivation of the brake, and that further provides that the brake shaft cannot be pulled out.

14. The castor wheel structure according to claim 8, wherein the crank is provided with a long arm and a short arm, wherein the long arm is used for activation of the brake by turning of the shaft in a clockwise direction, and the short arm is used for deactivation of the brake by turning of the shaft in a counter-clockwise direction.

15. The castor wheel structure according to claim 4, wherein the sealing ring is manufactured of NBR or silicone, and a tire, that also functions as the wheel part seal, is manufactured of a polyurethane material or NBR.

16. The castor wheel structure according to claim 1, wherein the wheel house, the transition element and the brake arm with the shaft are manufactured of corrosion-proof steel.

* * * * *